United States Patent
Dong et al.

(10) Patent No.: US 12,192,261 B2
(45) Date of Patent: Jan. 7, 2025

(54) LIVE BROADCAST METHOD, APPARATUS, AND SYSTEM

(71) Applicant: Petal Cloud Technology Co., Ltd., Dongguan (CN)

(72) Inventors: Xianliang Dong, Nanjing (CN); Ran Chen, Dongguan (CN)

(73) Assignee: Petal Cloud Technology Co., Ltd., Dongguan (CN)

( * ) Notice: Subject to any disclaimer, the term of this patent is extended or adjusted under 35 U.S.C. 154(b) by 0 days.

(21) Appl. No.: 18/547,002

(22) PCT Filed: Dec. 15, 2021

(86) PCT No.: PCT/CN2021/138223
§ 371 (c)(1),
(2) Date: Aug. 18, 2023

(87) PCT Pub. No.: WO2022/174664
PCT Pub. Date: Aug. 25, 2022

(65) Prior Publication Data
US 2024/0129352 A1 Apr. 18, 2024

(30) Foreign Application Priority Data
Feb. 20, 2021 (CN) .......................... 202110192823.9

(51) Int. Cl.
*H04L 65/61* (2022.01)
*G09B 5/06* (2006.01)
*G09B 5/14* (2006.01)

(52) U.S. Cl.
CPC .............. *H04L 65/61* (2022.05); *G09B 5/065* (2013.01); *G09B 5/14* (2013.01)

(58) Field of Classification Search
CPC ............ H04L 65/61; G09B 5/065; G09B 5/14
USPC ........................................................ 709/217
See application file for complete search history.

(56) References Cited

U.S. PATENT DOCUMENTS

| | | | | |
|---|---|---|---|---|
| 8,291,107 B1 * | 10/2012 | Upadhyay | ............... | H04L 65/80 709/224 |
| 9,741,257 B1 * | 8/2017 | Plain | ................... | H04L 65/1089 |
| 2014/0189063 A1 | 7/2014 | Carriero | | |
| 2015/0312613 A1 * | 10/2015 | Hunt | ................ | H04N 21/23439 725/37 |

(Continued)

FOREIGN PATENT DOCUMENTS

| CN | 104427364 A | | 3/2015 |
|---|---|---|---|
| CN | 110085060 A | * | 8/2019 |

(Continued)

OTHER PUBLICATIONS

Machine translation of CN 110706530 (Year: 2020).*

(Continued)

*Primary Examiner* — Ruolei Zong
(74) *Attorney, Agent, or Firm* — Fish & Richardson P.C.

(57) ABSTRACT

In an example method, a server determines first information of a terminal apparatus. The first information indicates a target media stream for the terminal apparatus. The example method further includes the server receiving a first media stream generated in a live broadcast process and transmitting the target media stream in the first media stream to the terminal apparatus according to an indication of the first information.

20 Claims, 17 Drawing Sheets

(56) References Cited

U.S. PATENT DOCUMENTS

| | | | | |
|---|---|---|---|---|
| 2015/0324379 A1* | 11/2015 | Danovitz | ........... | H04N 21/2743 |
| | | | | 707/825 |
| 2016/0072865 A1* | 3/2016 | Kaplinger | ............... | H04L 65/60 |
| | | | | 709/213 |
| 2017/0140658 A1* | 5/2017 | Aluvala | ................ | H04W 76/14 |
| 2017/0178002 A1* | 6/2017 | Moriarty | ................. | G06N 7/01 |

FOREIGN PATENT DOCUMENTS

| | | | |
|---|---|---|---|
| CN | 110471351 A | | 11/2019 |
| CN | 110706530 A | * | 1/2020 |

OTHER PUBLICATIONS

Extended European Search Report in European Appln No. 21926378.7, dated May 15, 2024, 10 pages.

International Search Report and Written Opinion in International Appln. No. PCT/CN2021/138223, mailed on Feb. 23, 2022, 15 pages (with English translation).

* cited by examiner

LIVE BROADCAST METHOD, APPARATUS, AND SYSTEM

CROSS-REFERENCE TO RELATED APPLICATIONS

This application is a national stage of International Application No. PCT/CN2021/138223 filed on Dec. 15, 2021, which claims priority to Chinese Patent Application No. 202110192823.9 filed on Feb. 20, 2021. Both of the aforementioned applications are hereby incorporated by reference in their entireties.

TECHNICAL FIELD

This application relates to the field of communication technologies, and specifically, to a live broadcast method, apparatus, and system.

BACKGROUND

Currently, to meet requirements for communication and interaction between users, live broadcast technologies are widely used. In a live broadcast process, a user who generates live content may generally use a terminal apparatus to generate a live media stream and transmit the media stream to a cloud server. The cloud server then transmits the media stream to another terminal apparatus, so that the another terminal apparatus displays the live content according to the received media stream for other users to watch.

For example, refer to FIG. 1. In a live broadcast process of an online course, a user who generates live content is usually a teacher, and a user who watches the live content is usually a student. A terminal apparatus on a teacher side may generate a live media stream in the live broadcast process, and transmit the media stream to a terminal apparatus on a student side through a cloud server, so that the student may watch the online course.

In addition, with an increase in communication requirements of users, types of media streams generated in a live broadcast process are increasing. For example, in the live broadcast process of the online course, the teacher may share desktop courseware, so that the student can watch the courseware. In this case, the transmitted media stream includes a media stream of a shared desktop. To improve fun of the course, the terminal apparatus on the teacher side may include a camera for capturing a posture of the teacher, so that the student can watch the posture of the teacher when watching the online course. In this case, the transmitted media stream includes a media stream of a camera. To improve interaction between the teacher and the student, both the terminal apparatus on the teacher side and the terminal apparatus on the student side may display a chat box, so that the teacher and the student can exchange information by using the chat box. Correspondingly, the transmitted media stream further includes a media stream of communication information.

If there are a plurality of types of live media streams, the cloud server may receive the plurality of types of media streams at the same time, and push the plurality of types of media streams to the terminal apparatus on a display side.

In the scenario of the foregoing example, refer to FIG. 2. The terminal apparatus on the teacher side may generate a plurality of media streams, and transmit the plurality of media streams to the cloud server. After receiving the plurality of media streams, the cloud server processes the plurality of media streams, and then pushes the plurality of media streams to the terminal apparatus on the student side. The terminal apparatus on the student side decodes the plurality of media streams to display content of the media streams.

In other words, if the media stream in the live broadcast process includes a plurality of media streams, a same terminal apparatus on the display side usually receives and displays a plurality of media streams that are pushed by the cloud server.

When the terminal apparatus displays content of the plurality of media streams, a screen is usually divided into a plurality of areas, and each area is used to display one type of the media stream. In this case, because a plurality of types of media streams are displayed on the same screen, a display space for the media streams is usually small(. Consequently, watching experience of the user is affected, and sometimes the user even cannot clearly watch the displayed content.

SUMMARY

To resolve a problem that in an existing live broadcast technology, a plurality of media streams are displayed on a same screen of a terminal apparatus, and that a user's watching experience is affected, embodiments of this application provide a live broadcast method, apparatus, and system.

According to a first aspect, an embodiment of this application discloses a live broadcast method, including:

a first server determines first information of a first terminal apparatus, where the first information is used to indicate a target media stream that the first terminal apparatus needs to obtain;

the first server receives a first media stream generated in a live broadcast process; and the first server transmits the target media stream in the first media stream to the first terminal apparatus according to an indication of the first information.

Through the foregoing steps, the first terminal apparatus may obtain the target media stream transmitted by the first server, and correspondingly, the first terminal apparatus needs to display only content of the target media stream, thereby avoiding to display too many types of media streams on the same first terminal apparatus, avoiding a problem that a display space for media streams is relatively small, further avoiding a problem that a user cannot clearly see live content, and improving the user's watching experience.

In an optional design, the first information includes information about the target media stream; or the first information includes an account level of a first account of the first terminal apparatus, where the first account is an account registered by the first terminal apparatus with the first server.

In an optional design, the first information includes information about the target media stream, and that the first server transmits the target media stream in the first media stream to the first terminal apparatus according to the indication of the first information includes:

the first server determines the target media stream in the first media stream according to the information about the target streaming media; and the first server transmits the target media stream to the first terminal apparatus.

Through the foregoing steps, the first server may determine, according to the information about the target media stream transmitted by the first terminal apparatus, the target media stream required by the first terminal apparatus.

In an optional design, the first information includes an account level of a first account of the first terminal apparatus, and that the first server transmits the target media stream in the first media stream to the first terminal apparatus according to the indication of the first information includes:

the first server determines the target media stream in the first media stream according to media stream levels corresponding to various media streams in the first media stream and the account level; and the first server transmits the target media stream to the first terminal apparatus.

Through the foregoing steps, the first server may determine, according to the account level of the first account of the first terminal apparatus, the target media stream required by the first terminal apparatus.

In an optional design, the method further includes:

the first server determines, according to registration information of the first account of the first terminal apparatus, that the first terminal apparatus has permission to obtain the target media stream, where the first account is an account registered by the first terminal apparatus with the first server.

Through this step, the first server may detect whether the first terminal apparatus has permission to obtain the target media stream, thereby improving reliability of a communication system.

According to a second aspect, an embodiment of this application discloses a live broadcast method, including:

a first terminal apparatus transmits first information to a first server, where the first information is used to indicate a target media stream that the first terminal apparatus needs to obtain;

the first terminal apparatus receives the target media stream transmitted by the first server; and the first terminal apparatus displays content of the target media stream.

Through the foregoing steps, the first terminal apparatus needs to display only content of the target media stream, thereby avoiding that too many types of media streams are displayed on the same first terminal apparatus, avoiding a problem that a display space for media streams is relatively small, further avoiding a problem that a user cannot clearly watch the live content, and improving watching experience of the user.

In an optional design, the first information includes information about the target media stream; or the first information includes an account level of a first account of the first terminal apparatus, where the first account is an account registered by the first terminal apparatus with the first server.

In an optional design, the first information includes information about the target media stream, and that a first terminal apparatus transmits first information to a first server includes:

the first terminal apparatus displays a registration interface for the first account, where the first account is an account registered by the first terminal apparatus with the first server, and the registration interface includes an option of at least one type of media stream;

the first terminal apparatus receives a first operation for the option of the at least one type of media stream, where the first operation is used to select a target media stream in the at least one type of media stream; and the first terminal apparatus transmits the first information to the first server according to the first operation.

Through the foregoing steps, the first terminal apparatus may obtain the first information including the information about the target media stream, and transmit the first information to the first server, so that the first server determines the target media stream of the first terminal apparatus according to the first information.

In an optional design, the method further includes:

the first terminal apparatus receives a second operation;

the first terminal apparatus displays, in response to the second operation, a selection interface including an option of at least one type of media stream;

the first terminal apparatus receives a third operation for the selection interface, where the third operation is used to select the target media stream that the first terminal apparatus needs to obtain; and the first terminal apparatus adjusts the first information according to the third operation, and transmitting the adjusted first information to the first server, where the adjusted first information includes the information about the target media stream selected in the third operation.

According to a first aspect, an embodiment of this application discloses a live broadcast apparatus, including:

a processor and a transceiver interface, where the processor is configured to determine first information of a first terminal apparatus, where the first information is used to indicate a target media stream that the first terminal apparatus needs to obtain; and the transceiver interface is configured to receive a first media stream generated in a live broadcast process, and transmit the target media stream in the first media stream to the first terminal apparatus according to an indication of the first information.

In an optional design, the first information includes information about the target media stream; or the first information includes an account level of a first account of the first terminal apparatus, where the first account is an account registered by the first terminal apparatus with the first server.

In an optional design, the first information includes information about the target media stream; or the transceiver interface is specifically configured to transmit the target media stream to the first terminal apparatus after the processor determines the target media stream in the first media stream according to the information about the target streaming media.

In an optional design, the first information includes an account level of a first account of the first terminal apparatus; and the transceiver interface is specifically configured to transmit the target media stream to the first terminal apparatus after the processor determines the target media stream in the first media stream according to media stream levels corresponding to various media streams in the first media stream and the account level.

In an optional design, the processor is further configured to determine, according to registration information of the first account of the first terminal apparatus, that the first terminal apparatus has permission to obtain the target media stream, where the first account is an account registered by the first terminal apparatus with the first server.

According to a first aspect, an embodiment of this application discloses a live broadcast apparatus, including:

a processor and a transceiver interface, where the transceiver interface is configured to: transmit first information to a first server, where the first information is used to indicate a target media stream that the first terminal apparatus needs to obtain; and receive the target media stream transmitted by the first server; and the processor is configured to control a screen to display content of the target media stream.

In an optional design, the first information includes information about the target media stream; or
the first information includes an account level of a first account of the first terminal apparatus, where the first account is an account registered by the first terminal apparatus with the first server.

In an optional design, the first information includes information about the target media stream; or
the transceiver interface is specifically configured to: after displaying a registration interface for the first account and receiving a first operation for an option of at least one type of media stream, transmit the first information to the first server according to the first operation; and
the first account is an account registered by the first terminal apparatus with the first server, the registration interface includes an option of at least one type of media stream, and the first operation is used to select a target media stream in the at least one type of media stream.

In an optional design, the transceiver interface is further configured to receive a second operation:
the processor is further configured to display, in response to the second operation, a selection interface including an option of at least one type of media stream;
the transceiver interface is further configured to receive a third operation for the selection interface, where the third operation is used to select the target media stream that the first terminal apparatus needs to obtain;
the processor is further configured to adjust the first information according to the third operation; and
the processor is further configured to transmit the adjusted first information to the first server, where the adjusted first information includes the information about the target media stream selected in the third operation.

According to a third aspect, an embodiment of this application provides a server, including:
at least one processor and a memory, where
the memory is configured to store program instructions; and
the processor is configured to invoke and execute the program instructions stored in the memory, to enable the terminal apparatus to perform the live broadcast method according to the first aspect.

According to a fourth aspect, an embodiment of this application discloses a terminal apparatus, including:
at least one processor and a memory, where
the memory is configured to store program instructions; and
the processor is configured to invoke and execute the program instructions stored in the memory, to enable the terminal apparatus to perform the live broadcast method according to the second aspect.

According to a fifth aspect, an embodiment of this application discloses a live broadcast system, including:
the server according to the third aspect; and
the terminal apparatus according to the fourth aspect.

According to a sixth aspect, an embodiment of this application provides a computer-readable storage medium. The computer-readable storage medium stores instructions; and when the instructions are run on a computer, the computer is enabled to perform the live broadcast method according to the first aspect.

According to a seventh aspect, an embodiment of this application provides a computer-readable storage medium. The computer-readable storage medium stores instructions; and when the instructions are run on a computer, the computer is enabled to perform the live broadcast method according to the second aspect.

Embodiments of this application provide a live broadcast method, apparatus, and system. In the method, the first server obtains the first information of the first terminal apparatus, where the first information is used to indicate the target media stream that the first terminal apparatus needs to obtain; and then the first server receives the first media stream generated in the live broadcast process, and transmits the target media stream in the first media stream to the first terminal apparatus after receiving the first media stream.

In an existing live broadcast solution, a terminal apparatus for displaying live content usually obtains all types of media streams generated in a live broadcast process, and displays content of all types of media streams on a screen of the terminal apparatus. A media stream generated in the live broadcast process is set as a first media stream. In a conventional technology, a terminal apparatus displays content of all types of media streams included in the first media stream, where content of different types of media streams is displayed in different areas on a screen of the terminal apparatus. Because the terminal apparatus needs to display all types of media streams, a display space for each type of media stream is relatively small. Consequently, watching experience of a user is affected, and even in some cases, the user cannot clearly watch content displayed on a screen.

According to the solutions provided in the embodiments of this application, the first terminal apparatus may indicate, by using the first information transmitted to the first server, the target media stream that the first terminal apparatus needs to obtain. In this case, the first server transmits the target media stream in the first media stream to the first terminal apparatus, and the first terminal apparatus needs to display only the content of the target media stream. Therefore, the first terminal apparatus may selectively display content of media streams, so as to avoid that too many types of media streams are displayed on the same first terminal apparatus, avoid a problem that a display space for the media streams is relatively small, further avoid a problem that a user cannot clearly watch live content, and improve watching experience of the user.

Further, in the solutions provided in the embodiments of this application, the first terminal apparatus needs to display only the content of the target media stream, where the target media stream is one or more of all media streams generated in the live broadcast process. In this case, if the user of the first terminal apparatus is interested in only a part of the media streams, the first terminal apparatus may use the part of the media streams as the target media streams. Correspondingly, the first terminal apparatus only needs to display the content of the part of the media streams. The display area for the part of the media streams on the screen is expanded when compared with that in the conventional technology, so that the user can watch the content that the user is interested in, thereby improving user experience.

In addition, if a same user has a plurality of first terminal apparatuses, target media streams of different first terminal apparatuses owned by the user may be different. In this case, each first terminal apparatus of the user may receive different target media streams, so that different first terminal apparatuses can display content of different media streams. In this solution, the user may watch different live content by using different first terminal apparatuses; and a display area for content of various media streams on a screen is expanded when compared with that in the conventional technology. In addition, the first terminal apparatuses of the user run independently and do not interfere with each other, thereby improving user experience in the live broadcast process.

DESCRIPTION OF EMBODIMENTS

The following describes technical solutions in embodiments of this application with reference to accompanying drawings in embodiments of this application.

In descriptions in embodiments of this application, "/" means "or" unless otherwise specified. For example, A/B may represent A or B. In this specification, "and/or" describes only an association relationship for describing associated objects and represents that three relationships may exist. For example. A and/or B may represent the following three cases: Only A exists, both A and B exist, and only B exists. In addition, in the description of embodiments of this application, "a plurality of" means "two or more".

The following terms "first" and "second" are merely intended for a purpose of description. In the descriptions of embodiments of this application, unless otherwise specified, "a plurality of" means two or more than two.

For clear and brief description of the following embodiments, a related technology is briefly described first.

Figure 1:
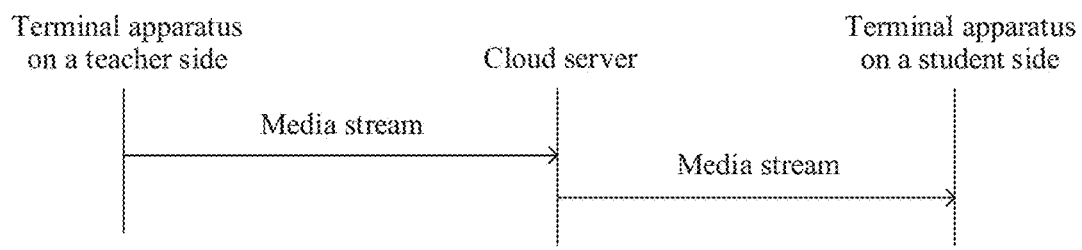
FIG. 1 is a schematic diagram of information exchange in a live broadcast process.
Figure 2:
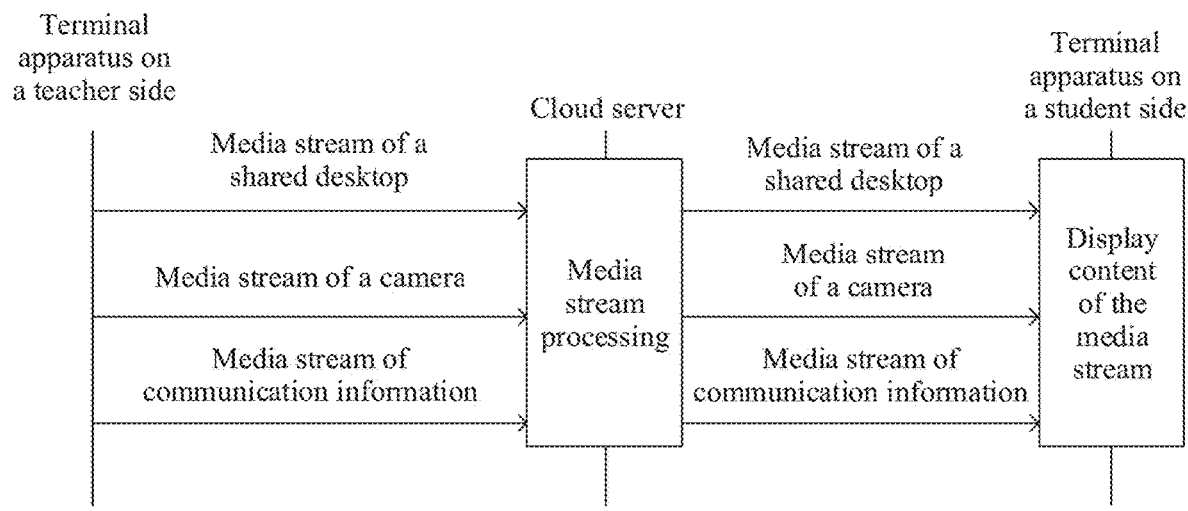
FIG. 2 is a schematic diagram of information exchange in another live broadcast process.
Figure 3:
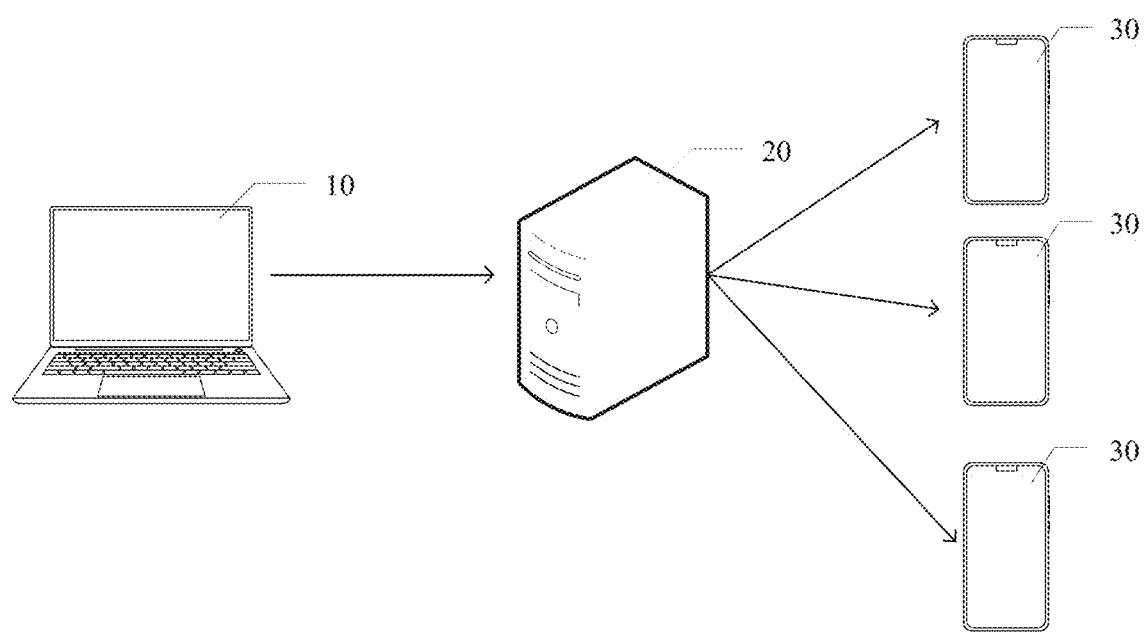
FIG. 3 is an example diagram of a communication system in a conventional technology.

FIG. 3 is an example diagram of a current communication system for live broadcast. Refer to FIG. 3. The current communication system usually includes a production terminal 10, a cloud server 20, and a display terminal 30. The production terminal 10 refers to a terminal apparatus that can generate a live media stream. For example, the production terminal 10 may be a terminal apparatus on a live broadcast object side. The live broadcast object is usually a user who is shown live in a live broadcast process. For example, in an online course training scenario, the live broadcast object is usually a teacher who gives a lecture; and in an online conference scenario, the live broadcast object is usually a speaker of the conference.

The production terminal 10 is connected to the cloud server 20 through a communication network. In a live broadcast process, the production terminal 10 generates a live media stream, and transmits the live media stream to the cloud server 20 through the communication network.

The display terminal 30 is a terminal apparatus configured to display live content. The display terminal 30 is usually placed on a side of a user that watches the live content. For example, in an online course training scenario, the display terminal 30 is located on a side of a student that watches the online course; and in a network conference scenario, the display terminal 30 is located on a side of a user that watches the conference content.

In addition, the display terminal 30 is also connected to the cloud server 20 through a communication network. After receiving the media stream transmitted by the production terminal 10, the cloud server 20 transmits the media stream to the display terminal 30 in real time through the communication network. After receiving the media stream, the display terminal 30 decodes and displays the media stream, so that the user on the side of the display terminal 30 can watch the live content.

The production terminal 10 usually generates a plurality of types of media streams. Currently, after obtaining the plurality of media streams transmitted by the production terminal 10, the cloud server 20 simultaneously transmits all media streams included in the live content to each display terminal 30. In other words, currently, one display terminal 30 may simultaneously receive all types of media streams generated in the live broadcast process, and simultaneously display content of all types of media streams.

For example, in the live broadcast process of the online course, the teacher may share desktop courseware, so that the student can watch the courseware. In this case, the media stream includes a media stream of a shared desktop. To improve fun of the course, the terminal apparatus on the teacher side may include a camera for capturing a posture of the teacher, so that the student can watch the posture of the teacher when watching the online course. In this case, the media stream includes a media stream of a camera. To improve interaction between the teacher and the student, both the terminal apparatus on the teacher side and the terminal apparatus on the student side may display a chat box, so that the teacher and the student can exchange information by using the chat box. Correspondingly, the media stream further includes a media stream of communication information.

In this case, in the live broadcast process, the production terminal 10 simultaneously generates a media stream of a shared desktop, a media stream of a camera, and a media stream of communication information. In addition, one display terminal 30 may simultaneously receive the foregoing three types of media streams that are pushed by the cloud server 20, and simultaneously display content of the foregoing three types of media streams on a screen of the display terminal 30 at the same time.

Figure 4:
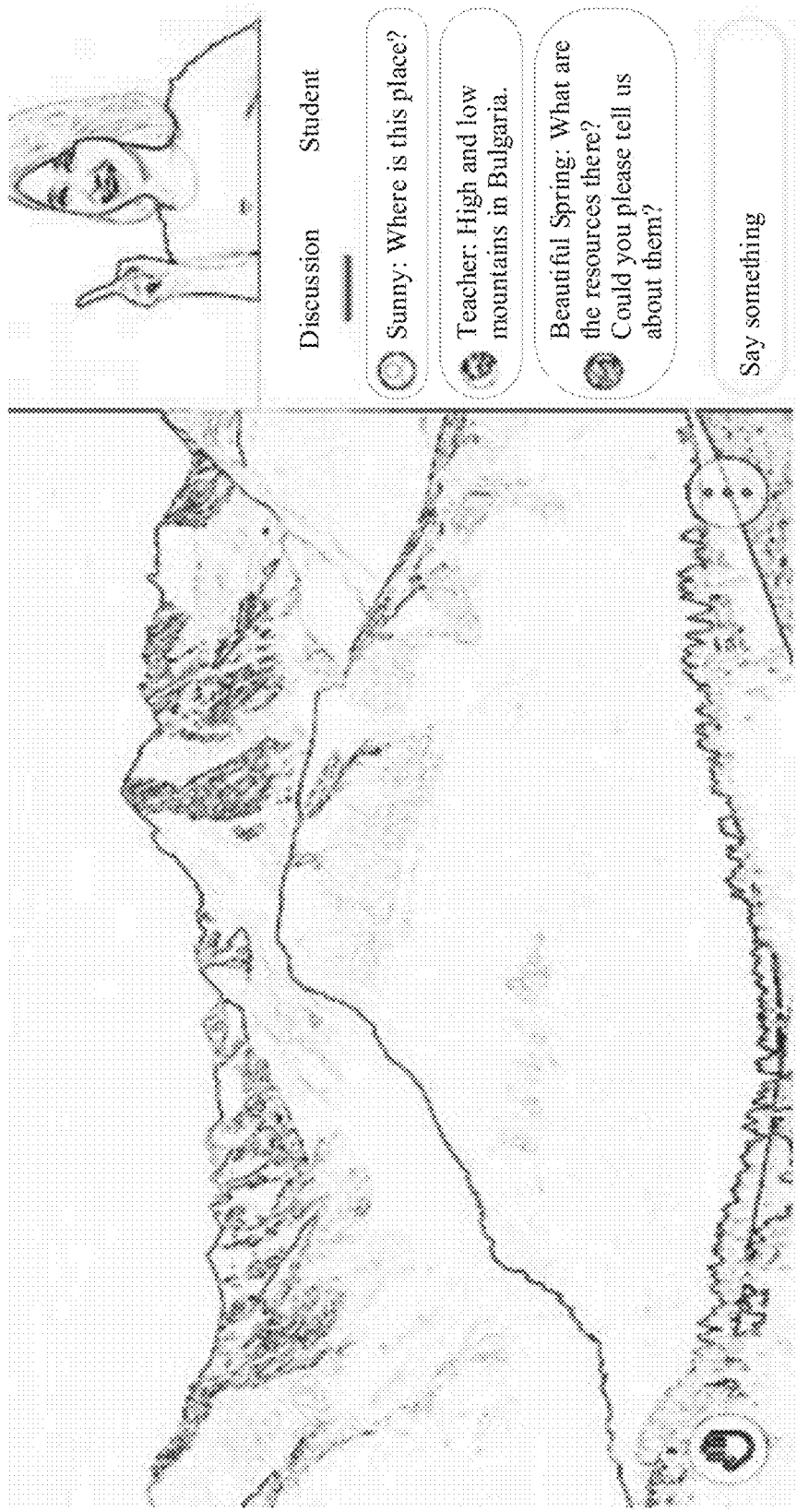
FIG. 4 is an example diagram of a screen in an existing live broadcast technology.

In addition, currently, after receiving a plurality of media streams, the display terminal 30 usually displays content of different media streams in different areas on the screen. Refer to an example diagram shown in FIG. 4. In this example, the display terminal 30 divides a screen into three areas, where a left area displays content of a media stream of a shared desktop. With the left area, a user who watches live broadcast can watch the shared desktop, so as to learn courseware content. In this example, the live online course content is an introduction to a mountain, and the courseware content is a picture of the mountain. Correspondingly, the left area displays the picture of the mountain. In addition, an upper right area of the screen displays content of a media stream of a camera. With this area, a user who watches the live broadcast can see postures, such as gestures, of the teacher. A lower right area of the screen displays content of a media stream of communication information. With this area, a user watching the live broadcast can watch communication information between other users, and may also upload the user's own communication information so as to communicate with other users. In this example, a student named "sunny" asks a teacher a question by uploading communication information, and the teacher answers the question of the student by using communication information uploaded by the teacher. In addition, a student named "beautiful spring" uploads the student's own communication information, and the communication information is used to ask the teacher to introduce resources of the mountain.

In a current live broadcast solution, one display terminal 30 needs to display content of a plurality of media streams at the same time, that is, the plurality of media streams are displayed on a same screen of the display terminal 30. Consequently, a display space for each type of media stream is relatively small, watching experience of a user is affected, and even in some cases, the user may not be able to clearly watch the displayed content.

To resolve a problem that in an existing live broadcast technology, a plurality of media streams are displayed on a same screen of a display terminal, and watching experience of a user is affected, the embodiments of this application provide a live broadcast method, apparatus, and system.

Figure 5A:
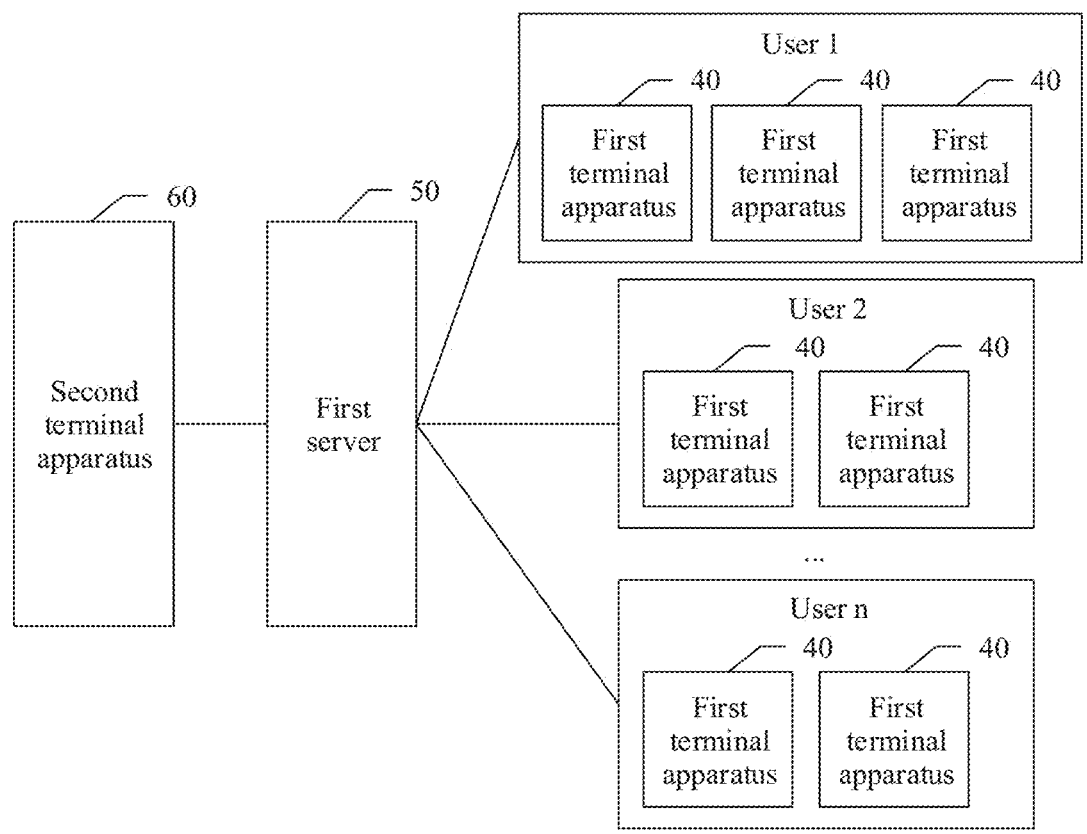
FIG. 5(a) is a schematic diagram of a communication system according to an embodiment of this application.
Figure 5B:
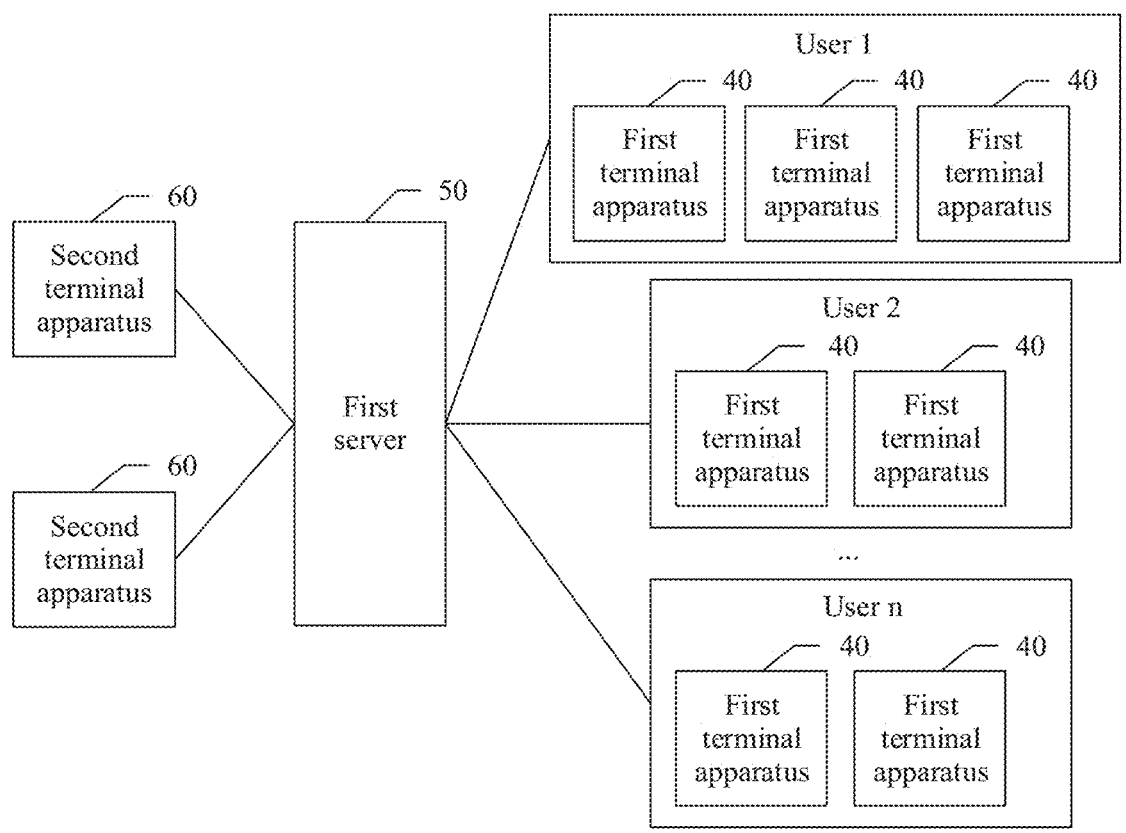
FIG. 5(b) is a schematic diagram of a communication system according to an embodiment of this application.

To clarify the solutions provided in the embodiments of this application, an embodiment of this application provides FIG. 5(a) and FIG. 5(b). Both FIG. 5(a) and FIG. 5(b) are communication systems to which the live broadcast method provided in the embodiments of this application is applied. The communication system includes a first terminal apparatus 40, a first server 50, and a second terminal apparatus 60.

The first terminal apparatus 40 is a terminal apparatus for displaying live content. In this embodiment of this application, a same user who watches the live broadcast may be equipped with a plurality of first terminal apparatuses 40, and content of different media streams may be displayed by using different first terminal apparatuses 40. In addition, the plurality of first terminal apparatuses 40 provided by the same user may be terminal apparatuses of a same type, or may be terminal apparatuses of different types.

For example, in FIG. 5(a) and FIG. 5(b), a user 1 is equipped with three first terminal apparatuses 40, and the three first terminal apparatuses 40 may be a computer, a mobile phone, and a television, respectively. In addition, a user 2 is equipped with two first terminal apparatuses 40, and the two first terminal apparatuses 40 may be a computer and a mobile phone, respectively; and a user n is equipped with two first terminal apparatuses 40, and the two first terminal apparatuses 40 may be a computer and a television, respectively.

In the solution provided in this embodiment of this application, the first terminal apparatus 40 may transmit first information to the first server 50. The first information is used to indicate a target media stream that the first terminal apparatus 40 needs to obtain. When a same user is equipped with a plurality of first terminal apparatuses 40, and different first terminal apparatuses 40 need to display content of different media streams, different first terminal apparatuses 40 may transmit different first information, so as to indicate that different first terminal apparatuses 40 need to obtain different target media streams.

The second terminal apparatus 60 is a terminal apparatus for generating live content. In addition, the second terminal apparatus 60 is connected to the first server 50 through a communication network. After generating a live media stream, the second terminal apparatus 60 transmits the media stream to the first server 50 in real time through the communication network.

In the communication system, there may be one or more second terminal apparatuses 60; and in a live broadcast process, the second terminal apparatuses 60 may generate a plurality of media streams.

For example, in FIG. 5(a), one second terminal apparatus 60 is included. The second terminal apparatus is a computer, and the computer generates a plurality of types of media streams. In addition, in FIG. 5(b), two second terminal apparatuses 60 are included. The two second terminal apparatuses 60 are a computer and a camera respectively. In this case, different second terminal apparatuses may generate different types of media streams. After generating a media stream, the second terminal apparatus 60 transmits the media stream to the first server, where the media stream transmitted by the second terminal apparatus may be referred to as a first media stream, and the first media stream may include at least one type of media stream.

In addition, after receiving the media stream, the first server 50 may transmit, according to the first information transmitted by each first terminal apparatus 40, the target media stream that meets a requirement of each first terminal apparatus 40 to each first terminal apparatus 40, so that each first terminal apparatus 40 obtains the target media stream that meets a requirement of the first terminal apparatus 40.

In this case, if different first terminal apparatuses 40 provided by a same user need to display content of different media streams, the first information transmitted by the different first terminal apparatuses 40 respectively indicates different media streams. Correspondingly, the first server 50 may transmit different media streams to the different first terminal apparatuses 40 according to the first information, so that the different first terminal apparatuses 40 display content of different media streams.

According to the communication system provided in this embodiment of this application, the first terminal apparatus may selectively display content of a media stream, so as to avoid that too many types of media streams are displayed on a same first terminal apparatus, avoid a problem that a user cannot clearly watch live content, and improve watching experience of the user.

It should be noted that the communication network may be a local area network, or may be a wide area network transferred by using a relay (relay) device, or may include a local area network and a wide area network. When the communication network is a local area network, for example, the communication network may be a near-distance communication network such as a Wi-Fi hotspot network, a Wi-Fi peer to peer (peer to peer, P2P) network, a Bluetooth network, a zig bee (zig bee) network, or a near field communication (near field communication, NFC) network. When the communication network is the wide area network, for example, the communication network may be a third generation wireless telephone technology (3rd-generation wireless telephone technology, 3G) network, a fourth generation mobile communication technology (the 4th generation mobile communication technology, 4G) network, a fifth generation mobile communication technology (5th-generation mobile communication technology, 5G) network, a future evolved public land mobile network (public land mobile network, PLMN), or the Internet. This is not limited in this application.

In addition, it should be understood that FIG. 5(a) and FIG. 5(b) are merely examples of a communication system for ease of understanding. However, this should not constitute any limitation on this application. The communication system may further include more servers, or may include more terminal apparatuses. Servers communicating with different terminal apparatuses may be a same server, or may be different servers, and quantities of the servers communicating with different terminal apparatuses may be the same or may be different. This is not limited in this embodiment of this application. It should be further understood that the server in the communication system may be any device having transceiver function or a chip that can be disposed in the device.

Further, in the solutions provided in the embodiments of this application, the first terminal apparatus may be a plurality of types of terminal apparatuses. In some embodiments, the first terminal apparatus may be a terminal apparatus that can display live content, such as a mobile phone, a tablet computer, a desktop computer, a laptop computer, a notebook computer, an ultra-mobile personal computer (ultra-mobile personal computer, UMPC), a handheld computer, or a netbook. A specific form of the terminal apparatus is not specially limited in this application.

Figure 6:
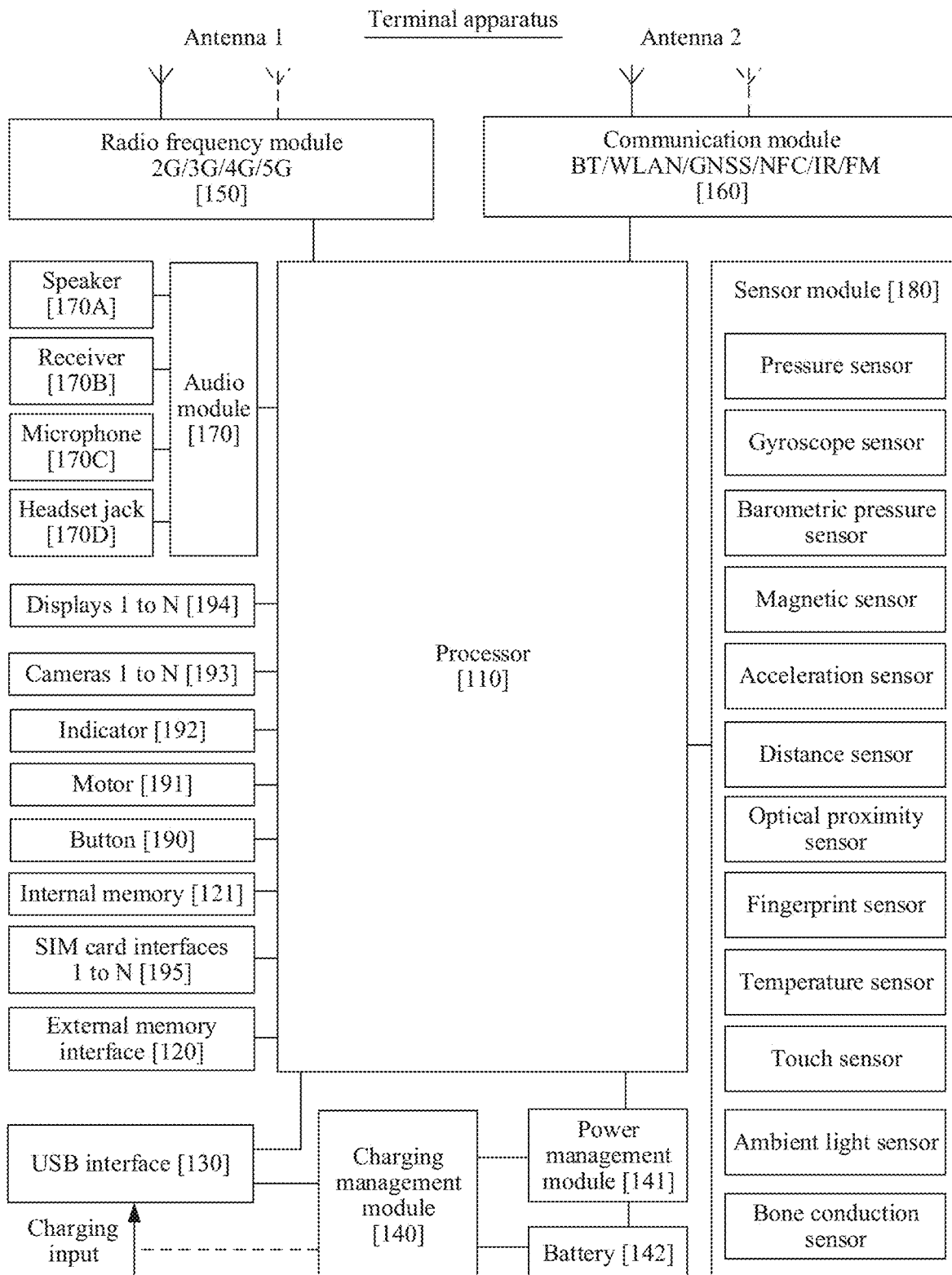
FIG. 6 is a schematic diagram of a structure of a terminal apparatus according to an embodiment of this application.

For example, the first terminal apparatus is a smartphone, and a schematic diagram of a structure of the first terminal apparatus may be shown in FIG. 6. Refer to FIG. 6. The terminal apparatus may include a processor 110, an external memory interface 120, an internal memory 121, a universal serial bus (universal serial bus, USB) interface 130, a charging management module 140, a power management module 141, a battery 142, an antenna 1, an antenna 2, a radio frequency module 150, a communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

It may be understood that the structure shown in this embodiment of this application does not constitute a specific limitation on the mobile phone. In some other embodiments of this application, the mobile phone may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the mobile phone. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus. USB) interface, and/or the like.

The I2C interface is a two-way synchronization serial bus, and includes one serial data line (serial data line. SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the communication module 160 through the I2S interface, to implement a function of answering a call by using a Bluetooth headset.

The PCM interface may also be configured to perform audio communication, and sample, quantize, and encode an analog signal. In some embodiments, the audio module 170 may be coupled to the communication module 160 through a PCM bus. In some embodiments, the audio module 170 may also transmit an audio signal to the communication module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the communication module 160. For example, the processor 110 communicates with a Bluetooth module in the communication module 160 through the UART interface, to implement a Bluetooth function. In some embodiments, the audio module 170 may transmit an audio signal to the communication module 160 through the UART interface, to implement a function of playing music by using a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 and the camera 193 communicate with each other through the CSI interface, to implement a photographing function of the mobile phone. The processor 110 communicates with the display 194 through the DSI interface, to implement a display function of the mobile phone.

The GPIO interface may be configured by using software. The GPIO interface may be configured as a control signal, or may be configured as a data signal. In some embodiments, the GPIO interface may be configured to connect the processor 110 to the camera 193, the display 194, the communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the mobile phone, or may be configured to transmit data between the mobile phone and a peripheral device, or may be configured to connect to a headset for playing audio through the headset. The interface may be further configured to connect to another terminal apparatus such as an AR device.

It may be understood that an interface connection relationship between the modules illustrated in embodiments of this application is merely an example for description, and does not constitute a limitation on a structure of the mobile phone. In some other embodiments of this application, the mobile phone may alternatively use an interface connection manner different from those in the foregoing embodiments or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the mobile phone. When charging the battery 142, the charging management module 140 may further supply power to the terminal apparatus by using the power management module 141.

The power management module 141 is configured to connect to the battery 142, the charging management module 140, and the processor 110. The power management module 141 receives an input of the battery 142 and/or an input of the charging management module 140, to supply power to the processor 110, the internal memory 121, an external memory, the display 194, the camera 193, the communication module 160, and the like. The power management module 141 may be further configured to monitor parameters such as a battery capacity, a battery cycle count, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the mobile phone may be implemented by using the antenna 1, the antenna 2, the radio frequency module 150, the communication module 160, the modem processor, the baseband processor, and the like.

The antenna 1 and the antenna 2 are configured to transmit and receive an electromagnetic wave signal. Each antenna in the mobile phone may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The radio frequency module 150 may provide a solution that is applied to a mobile phone and that includes wireless communication such as 2G/3G/4G/5G. The radio frequency module 150 may include at least one filter, a switch, a power amplifier, a low noise amplifier (low noise amplifier, LNA), and the like. The radio frequency module 150 may receive an electromagnetic wave through the antenna 1, perform processing such as filtering or amplification on the received electromagnetic wave, and transmit the electromagnetic wave to the modem processor for demodulation. The radio frequency module 150 may further amplify a signal modulated by the modem processor, and convert the signal into an electromagnetic wave for radiation through the antenna 1. In some embodiments, at least some functional modules of the radio frequency module 150 may be disposed in the processor 110. In some embodiments, at least some functional modules of the radio frequency module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent device. In some other embodiments, the modem processor may be independent of the processor 110, and is disposed in a same device as the radio frequency module 150 or another functional module.

The communication module 160 may provide a wireless communication solution that is applied to the mobile phone, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The communication module 160 may be one or more devices integrating at least one communication processing module. The communication module 160 receives an electromagnetic wave through the antenna 2, performs frequency modulation and filtering processing on an electromagnetic wave signal, and sends a processed signal to the processor 110. The communication module 160 may further receive a to-be-sent signal from the processor 110, perform frequency modulation and amplification on the signal, and convert the signal into an electromagnetic wave for radiation through the antenna 2.

In some embodiments, the antenna 1 of the mobile phone is coupled to the radio frequency module 150, and the antenna 2 is coupled to the communication module 160, so that the mobile phone can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile phone implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute a program instruction to generate or change display information. In this embodiment of this application, the display 194 may include a display device and a touch device. The display is configured to output display content to the user, and the touch device is configured to receive a touch event input by the user on the display 194.

In the mobile phone, the sensor module 180 may include one or more of a gyroscope, an acceleration sensor, a pressure sensor, a barometric pressure sensor, a magnetic sensor (for example, a Hall effect sensor), a distance sensor, an optical proximity sensor, a fingerprint sensor, a temperature sensor, a touch sensor, and a pyroelectric infrared sensor, an ambient light sensor, a bone conduction sensor, or the like. This is not limited in this embodiment of this application.

The mobile phone can implement a photographing function by using the ISP, the camera 193, the video codec, the GPU, the flexible display 194, the application processor, and the like.

The ISP is configured to process data fed back by the camera 193. For example, during photographing, a shutter is pressed, and light is transmitted to a photosensitive element of the camera by using a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the mobile phone may include one or N cameras 193, where N is a positive integer greater than 1.

The digital signal processor is configured to process a digital signal, and may process another digital signal in addition to the digital image signal. For example, when the mobile phone selects a frequency, the digital signal processor is configured to perform Fourier transformation on frequency energy.

The video codec is configured to compress or decompress a digital video. The mobile phone may support one or more video codecs. In this way, the mobile phone can play or record videos in various coding formats such as moving picture experts group (moving picture experts group, MPEG) 1, MPEG2, MPEG3, and MPEG4.

The NPU is a neural-network (neural-network, NN) computing processor. By referring to a structure of a biological neural network, such as a transfer mode between human brain neurons, the NPU quickly processes input information, and can further perform continuous self-learning. Applications such as an intelligent cognition of the mobile phone may be implemented by using the NPU, such as image recognition, facial recognition, speech recognition, and text understanding.

The external memory interface 120 may be configured to connect to an external storage card such as a micro SD card, to extend a storage capability of the mobile phone. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 executes various function applications and data processing of the mobile phone by running instructions stored in the internal memory 121. The internal memory 121 may include a program storage area and a data storage area. The program storage area may store an operating system, an application required for at least one function (such as a sound playing function and an image display function), and the like. The data storage area may store data (such as audio data and contacts) created during use of the mobile phone, and the like. In addition, the internal memory 121 may include a high-speed random access memory, and may further include a non-volatile memory, for example, at least one magnetic disk storage device, a flash memory device, and a universal flash storage (universal flash storage, UFS).

The mobile phone can implement audio functions (such as music playing and sound recording) by using the audio module 170, the speaker 170A, the receiver 170B, the microphone 170C, the headset jack 170D, the application processor, for example, determining a network standard and recording.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile phone may be used to listen to music or answer a hands-free call by using the speaker 170A.

The receiver 170B, also referred to as an "earpiece", is configured to convert an electrical audio signal into a sound signal. When the mobile phone is used to answer a call or receive voice information, the receiver 170B may be put close to a human ear, to receive voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the mobile phone. In some other embodiments, two microphones 170C may be disposed in the mobile phone, to collect a sound signal and implement a noise reduction function. In some other embodiments, three, four, or more microphones 170C may alternatively be disposed in the mobile phone, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The button 190 includes a power button, a volume button, and the like. The button 190 may be a mechanical button, or may be a touch button. The mobile phone may receive a button input, and generate a button signal input related to a user setting and function control of the mobile phone.

The motor 191 may generate a vibration prompt. The motor 191 may be configured to provide an incoming call vibration prompt or a touch vibration feedback. For example, touch operations performed on different applications (such as photographing and audio playing) may correspond to different vibration feedback effects. The motor 191 may also correspond to different vibration feedback effects for touch operations performed on different areas of the flexible display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the mobile phone. The mobile phone may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The mobile phone interacts with a network by using the SIM card, to implement functions such as calling and data communication. In some embodiments, the mobile phone uses an eSIM, that is, an embedded SIM card. The eSIM card may be embedded in the mobile phone, and cannot be separated from the mobile phone.

In addition, an operating system runs on the foregoing components, for example, an iOS operating system developed by Apple, an Android Android open-source operating system developed by Google, and a Windows operating system developed by Microsoft. An application may be installed and run on the operating system.

To resolve a problem that in an existing live broadcast technology, a plurality of media streams are displayed on a same screen of a display terminal, and watching experience of a user is affected, the embodiments of this application provide a live broadcast method, apparatus, and system.

To clarify the solutions provided in this application, the following describes the solutions provided in this application by using embodiments with reference to the accompanying drawings.

Figure 7:
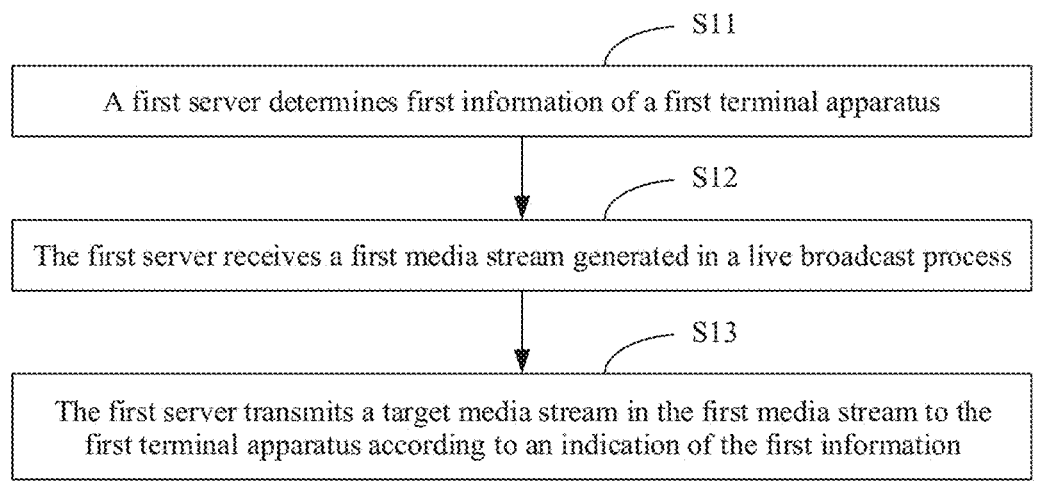
FIG. 7 is a schematic diagram of a workflow of a live broadcast method according to an embodiment of this application.

Refer to a schematic diagram of a workflow shown in FIG. 7. A live broadcast method according to an embodiment of this application includes the following steps.

Step S11: A first server determines first information of a first terminal apparatus, where the first information is used to indicate a target media stream that the first terminal apparatus needs to obtain.

In this embodiment of this application, the first server is connected to the first terminal apparatus and the second terminal apparatus through a communication network, where the first terminal apparatus includes a terminal apparatus that displays live content, and the second terminal apparatus includes a terminal apparatus that generates live content.

In addition, in a live broadcast process, the live content may include one or more types of media streams. In this case, the first terminal apparatus may obtain one or more types of media streams. Correspondingly, the first terminal apparatus may need to obtain one or more types of target media streams.

There are usually a plurality of first terminal apparatuses connected to the first server. In the solution provided in this embodiment of this application, if a same user watches live broadcast by using a plurality of first terminal apparatuses, the plurality of first terminal apparatuses may separately display content of different media streams, and the plurality of first terminal apparatuses usually need to obtain different target media streams. When a plurality of first terminal apparatuses of a same user are used to perform live broadcast, the user may log in to the first server from the plurality of first terminal apparatuses by using a same account or different accounts.

For example, if a user is equipped with first terminal apparatuses such as a television, a computer, and a mobile phone, when the user watches an online course through live broadcast, media streams generated in a live broadcast process usually include a media stream of a shared desktop, a media stream of a camera, and a media stream of communication information. Because a screen size of the television is relatively large, the target media stream that needs to be obtained by the television may be a media stream of a shared desktop, so that the user can watch content of courseware by using a large-screen television. In addition, the target media stream that needs to be obtained by the computer may be a media stream of a camera, so that the user can watch, by using the computer, a posture change of a teacher during a lecture. The target media stream that needs to be obtained by the mobile phone may be a media stream of communication information. In this case, the user may watch the communication information by using the mobile phone, and input, by using the mobile phone, communication information that the user needs to express, to implement communication and interaction with other audiences and teachers.

In addition, if the live content includes at least two types of media streams, and a user pays attention to only a part of the media streams, the target media stream that the first terminal apparatus of the user needs to obtain may be the part of the media streams, so as to avoid that content of all types of media streams are displayed on the screen of the first terminal apparatus, and correspondingly avoid that the screen of the first terminal apparatus is relatively crowded. For example, when a user watches an online course by using a mobile phone, media streams generated in a live broadcast process usually include a media stream of a shared desktop, a media stream of a camera, and a media stream of communication information. Because a screen size of the mobile phone is relatively small, if content of all media streams is displayed, a screen interface is usually relatively crowded. In this case, the user usually pays more attention to the media stream of a shared desktop and the media stream of communication information, so as to watch the courseware and perform communication and interaction with the teacher. In this case, the target media stream that the mobile phone needs to obtain includes the media stream of a shared desktop and the media stream of communication information.

Step S12: The first server receives a first media stream generated in the live broadcast process.

In this embodiment of this application, the first server may be connected, through a communication network, to the second terminal apparatus that generates the live content. The second terminal apparatus generates a media stream of the live content in the live broadcast process, and transmits the media stream to the first server in real time.

In the live broadcast process, the second terminal apparatus usually generates at least one type of media stream, and the first media stream includes at least one type of media stream.

Step S13: The first server transmits the target media stream in the first media stream to the first terminal apparatus according to an indication of the first information.

After receiving the first information, the first server may determine, according to the first information, the target media stream that the first terminal apparatus needs to obtain. After receiving the first media stream generated in the live broadcast process, the first server may determine the target media stream in the first media stream, and transmit the target media stream to the first terminal apparatus.

In this step, to improve the experience of the user when watching the live broadcast, the first server usually transmits the target media stream to the first terminal apparatus in real time after receiving the first media stream.

In addition, after receiving the target media stream, the first terminal apparatus may display content of the target media stream in real time for the user to watch.

An embodiment of this application provides a live broadcast method. In the method, a first server obtains first information of a first terminal apparatus, where the first information is used to indicate a target media stream that the first terminal apparatus needs to obtain; and then the first server receives a first media stream generated in a live broadcast process, and transmits the target media stream in the first media stream to the first terminal apparatus after receiving the first media stream.

In an existing live broadcast solution, a terminal apparatus for displaying live content usually obtains all types of media streams generated in a live broadcast process, and displays content of all types of media streams on a screen of the terminal apparatus. A media stream generated in the live broadcast process is set as a first media stream. In a conventional technology, a terminal apparatus displays content of all types of media streams included in the first media stream, where content of different types of media streams is displayed in different areas on a screen of the terminal apparatus. Because the terminal apparatus needs to display all types of media streams, a display space for each type of media stream is relatively small. Consequently, watching experience of a user is affected, and even in some cases, the user cannot clearly watch content displayed on a screen.

According to the solution provided in this embodiment of this application, the first terminal apparatus may indicate, by using the first information transmitted to the first server, the target media stream that the first terminal apparatus needs to obtain. In this case, the first server transmits the target media stream in the first media stream to the first terminal apparatus, and the first terminal apparatus needs to display only the content of the target media stream. Therefore, the first terminal apparatus may selectively display content of media streams, so as to avoid that too many types of media streams are displayed on the same first terminal apparatus, avoid a problem that a display space for the media streams is relatively small, further avoid a problem that a user cannot clearly watch live content, and improve watching experience of the user.

Further, in the solutions provided in the embodiments of this application, the first terminal apparatus needs to display only the content of the target media stream, where the target media stream is one or more of all media streams generated in the live broadcast process. In this case, if the user of the first terminal apparatus is interested in only a part of the media streams, the first terminal apparatus may use the part of the media streams as the target media streams. Correspondingly, the first terminal apparatus only needs to display the content of the part of the media streams. The display area for the part of the media streams on the screen is expanded when compared with that in the conventional technology, so that the user can watch the content that the user is interested in, thereby improving user experience.

In addition, if a same user has a plurality of first terminal apparatuses, target media streams of different first terminal apparatuses owned by the user may be different. In this case, each first terminal apparatus of the user may receive different target media streams, so that different first terminal apparatuses can display content of different media streams. In this solution, the user may watch different live content by using different first terminal apparatuses; and a display area for content of various media streams on a screen is expanded when compared with that in the conventional technology. In addition, the first terminal apparatuses of the user run independently and do not interfere with each other, thereby improving user experience in the live broadcast process.

To clarify advantages of the embodiments of this application, the embodiments of this application provide two examples. In the two examples, the first terminal apparatus is configured to watch an online course.

Figure 8A:
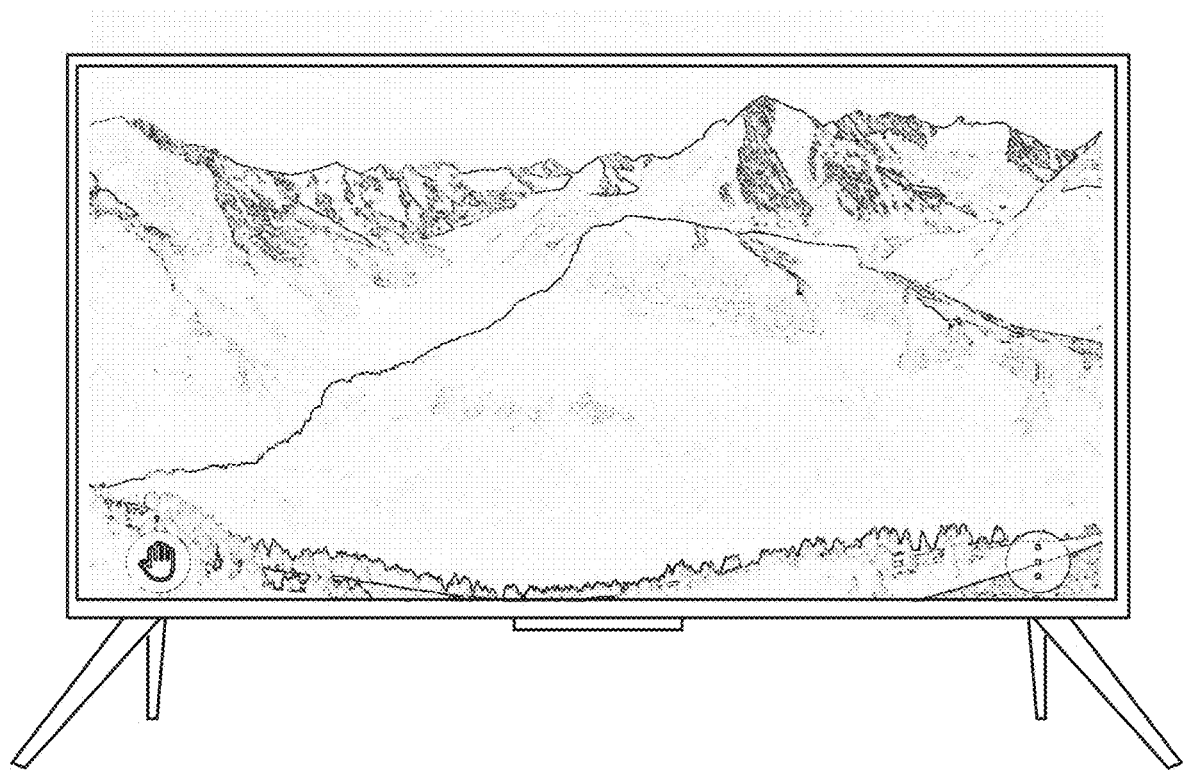
FIG. 8(a) is a schematic diagram of an interface of a terminal apparatus in a live broadcast method according to an embodiment of this application.
Figure 8B:
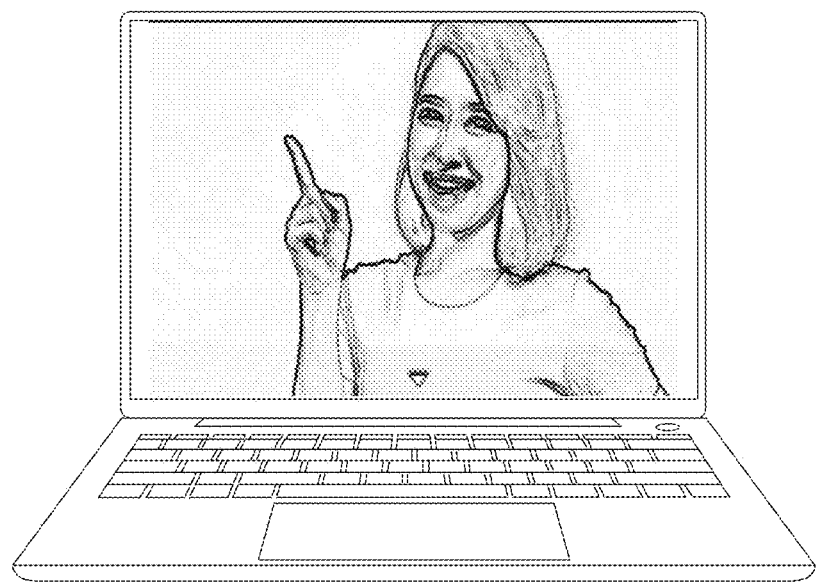
FIG. 8(b) is a schematic diagram of an interface of another terminal apparatus in a live broadcast method according to an embodiment of this application.
Figure 8C:
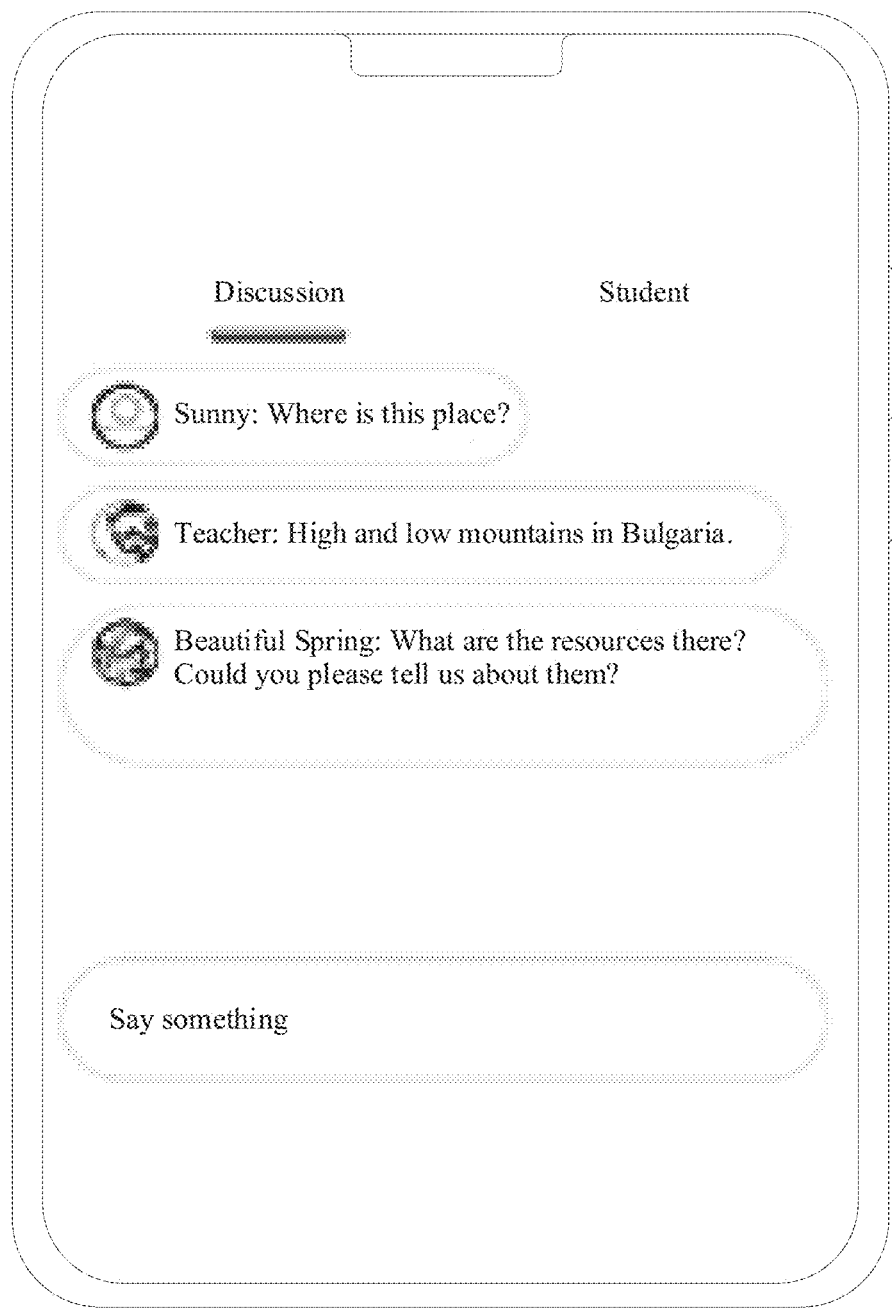
FIG. 8(c) is a schematic diagram of an interface of still another terminal apparatus in a live broadcast method according to an embodiment of this application.

FIG. 8(a) to FIG. 8(c) correspond to an example. In the example, first terminal apparatuses owned by a same user include a television, a computer, and a mobile phone. FIG. 8(a) to FIG. 8(c) are schematic diagrams of interfaces of the first terminal apparatuses of the user. The first terminal apparatus in FIG. 8(a) is a television, and the target media stream of the television is a media stream of a shared desktop; and correspondingly, a screen of the television displays content of the media stream of a shared desktop, so that the user watches courseware of the online course by using the television. In addition, the first terminal apparatus in FIG. 8(b) is a computer, and the target media stream of the computer is a media stream of a camera; and correspondingly, a screen of the computer displays content of the media stream of a camera. The target media stream in FIG. 8(c) is a media stream of communication information; and correspondingly, a screen of the mobile phone displays content of the media stream of communication information.

In this example, the different first terminal apparatuses of the same user receive different target media streams and display content of the different media streams, and the first terminal apparatuses do not interfere with each other. In addition, a size of a display area for each target media stream is relatively large, so that the user can watch the target media streams conveniently, and the user's experience of watching the live broadcast is improved.

Figure 8D:
FIG. 8(d) is a schematic diagram of an interface of still another terminal apparatus in a live broadcast method according to an embodiment of this application.

In addition, FIG. 8(d) corresponds to another example. In this example, first terminal apparatuses owned by a same user include a television and a computer. The target media stream of the television is a media stream of a shared desktop; and correspondingly, a screen of the television displays content of the media stream of a shared desktop. A schematic diagram of the screen of the television may be shown in FIG. 8(a). In addition, FIG. 8(d) is a schematic diagram of an interface of the computer of the user. The target media stream of the computer includes a media stream of a camera and a media stream of communication information; and correspondingly, a screen of the computer displays content of the media stream of a camera and content of the media stream of communication information.

In this example, the first terminal apparatuses of the same user do not interfere with each other. In addition, a size of a display area for each target media stream is relatively large when compared with that in the conventional technology, so that the user can watch the target media stream conveniently, and the experience of the user when watching the live broadcast is improved.

Alternatively, in another example, a movie and television company provides a live broadcast operation for a movie, and provides a chat window. By using the chat window, movie audiences and operation personnel of the movie and television company may communicate with each other in a live broadcast process. In this case, the first media stream includes a media stream of movie content and a media stream of communication information.

Figure 9A:
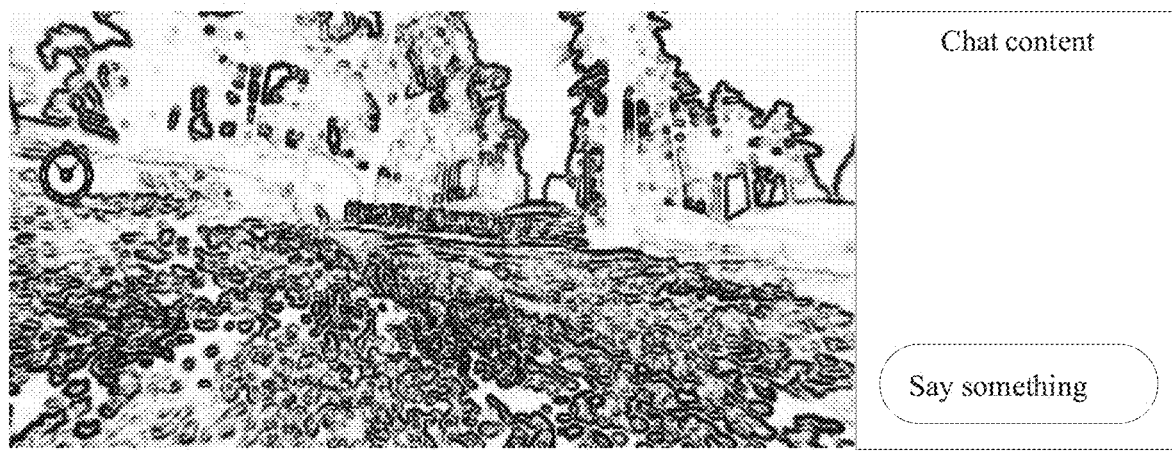
FIG. 9(a) is a schematic diagram of an interface of a terminal apparatus in a live broadcast method in a conventional technology.
Figure 9B:
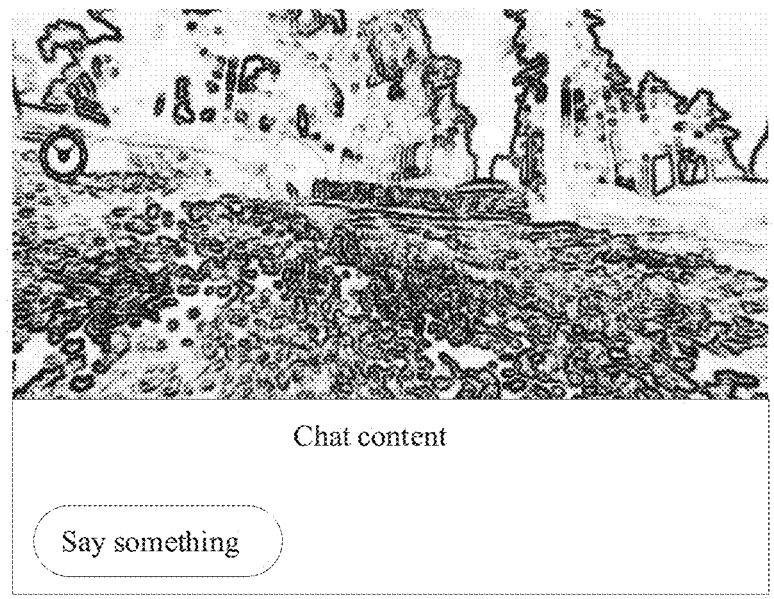
FIG. 9(b) is a schematic diagram of an interface of another terminal apparatus in a live broadcast method in a conventional technology.

In the conventional technology, a same terminal apparatus displaying live content receives a media stream of the movie content and a media stream of communication information, and simultaneously displays a movie content interface and a chat window in different screen areas of the terminal apparatus, where the communication information is displayed in the chat window. A screen of the terminal apparatus may be shown in FIG. 9(a) or FIG. 9(b). In FIG. 9(a), the chat window is located on the right side of the movie content interface, and in FIG. 9(b), the chat window is located on the lower side of the movie content. The movie content interface and the chat window are jointly displayed on a same screen of the terminal apparatus, and are separately used to display movie content and communication information. Consequently, a display area for the movie content is relatively small, which affects a movie watching effect.

A large-screen smart screen and a computer are disposed at home of a user A; the user needs to watch a live movie by using the smart screen; and in a process of watching the movie, the user needs to communicate with other movie audiences and operation personnel by using the computer.

In this case, both the smart screen and the computer of the user A are the first terminal apparatuses. The target media stream of the smart screen includes a media stream of movie content, and the target media stream of the computer includes a media stream of communication information. Correspondingly, a server of the movie and television company transmits the media stream of the movie content to the smart screen; and after the smart screen receives the media stream of the movie content, the smart screen displays the movie content, to meet a requirement of the user A for watching the live movie. In addition, the server may further transmit the media stream of communication information to the computer; and after receiving the media stream of communication information, the computer displays the communication information, so as to meet a requirement of the user A for communication in the process of watching the live movie.

Therefore, according to the solution in this embodiment of this application, the user A can experience an audio-visual effect of the large screen provided by the smart screen, and can further perform real-time communication and interaction with another person by using a computer. The smart screen and the computer run independently, and do not cause mutual interference. In addition, because the movie content may be independently displayed on the screen of the smart screen, a display area for the movie content is relatively large, thereby improving movie watching experience of the user.

It can be learned from the foregoing example that, according to the solution provided in this embodiment of this application, the first terminal apparatus may obtain one or more types of media streams (that is, the target media stream of the first terminal apparatus) generated in the live broadcast process, and does not need to obtain all media streams each time. Correspondingly, content of all media streams does not need to be displayed on the first terminal apparatus. This effectively alleviates the problem in the conventional technology that the display space for each type of media stream is relatively small, and avoids that the user cannot clearly watch live content, thereby improving user experience.

The first terminal apparatus indicates, by using the first information, the target media stream that the first terminal apparatus needs to obtain. The first information may include a plurality of types of information. In a feasible implementation solution, the first information includes information about the target media stream.

The information about the target media stream may include a name of the target media stream. Alternatively, if a protocol is set between the first server and the first terminal apparatus, and the protocol sets code of various media streams, in this case, the information about the target media stream may include code of the target media stream. Certainly, the information about the target media stream may further include other information that can be used by the first server to determine a type of the target media stream. This is not limited in this embodiment of this application.

Alternatively, in another feasible implementation solution, the first information includes an account level of a first account of the first terminal apparatus, and the first account is an account registered by the first terminal apparatus with the first server.

A media stream level of the target media stream of the first terminal apparatus may be the same as the account level of the first account of the first terminal apparatus. Alternatively, a correspondence between an account level and a media stream level may be set. In this case, after the account level of the first account is determined, the target media stream of the first terminal apparatus may be determined according to the account level of the first account and the correspondence between the account level and the media stream level.

The first terminal apparatus usually needs to register the first account with the first server; and after the first account is registered, the first server transmits a media stream to the first terminal apparatus, so that a user on a side of the first terminal apparatus can watch live broadcast. In the solution provided in this embodiment of this application, a plurality of account levels may be set, and different account levels correspond to different media streams. In this case, the first server may determine the target media stream in the first media stream for the first terminal apparatus according to the account level of the first account.

For example, when an enterprise performs remote training through live broadcast, the first terminal apparatus usually includes a computer in an office and a mobile phone of each user participating in training, and the second terminal apparatus includes a terminal apparatus on a training teacher side. In a training process, a training teacher may share desktop training courseware, so that a user participating in the training can watch the courseware. In this case, the live media stream includes a media stream of a shared desktop. To facilitate communication in the training process, the live media stream may further include a media stream of communication information.

Because a screen size of a computer is relatively large, it is generally expected that a computer receives a media stream of a shared desktop, so as to display the courseware, and each mobile phone receives the media stream of communication information, so that the user participating in training and the training teacher can communicate with each other. In this case, the account level of the first account of the computer may be set to be the same as the media stream level of the media stream of a shared desktop, and the account level of the first account of the mobile phone may be set to be the same as the media stream level of the media stream of communication information.

In this case, the first server may determine, according to the account level of the first account of the computer, that the target media stream of the computer is the media stream of a shared desktop, and transmit the media stream of a shared desktop to the computer, so that the computer displays the training courseware. In addition, the first server may determine, according to the account level of the first account of the mobile phone, that the target media stream of the mobile phone is the media stream of communication information, and transmit the media stream of communication information to the mobile phone, so that the mobile phone of each user participating in training display the communication information by using a chat box, thereby implementing communication.

Because the first account is a registered account of the first terminal apparatus on the first server, the first server may generally determine the account level of the first account according to related information of the first account.

In a feasible implementation, the related information of the first account includes recharge information of the first account. If the first terminal apparatus needs to recharge when being used for watching live broadcast, in this case, the account level may be determined based on a recharge fee of the first terminal apparatus. A higher recharge fee of the first terminal apparatus indicates a higher account level of the first account of the first terminal apparatus. The first server may determine the account level of the first account of each terminal apparatus according to the recharge information of each first terminal apparatus.

Alternatively, in another implementation, the related information of the first account includes identity information of the first terminal apparatus corresponding to the first account. Generally, a plurality of first terminal apparatuses are jointly used for watching live broadcast, and identities of the first terminal apparatuses are usually different. For example, a plurality of first terminal apparatuses form a group, including a group owner and group members, and identities of the first terminal apparatus may include the group owner and the group members.

In this solution, the first server determines the account level of the first account according to the related information of the first account, and then determines the target media stream of the first terminal apparatus according to the account level.

For example, a plurality of first terminal apparatuses used for watching live broadcast form a group, where an account level of a first account of a group owner in the group is relatively high, and an account level of a first account of another group member is relatively low. In this case, in a live remote training process, a computer in a conference room and a mobile phone of each user participating in the training form a group. If a media stream level of a media stream of a shared desktop is relatively high, the computer may be set as a group owner, and each mobile phone is a group member. Correspondingly, an account level of the computer is relatively high. The first server may determine, according to the account level of the computer, that a target media stream of the computer is a media stream of a shared desktop. In addition, the first server may further determine, according to the account level of the mobile phone, that the target media stream of the mobile phone is the media stream of communication information.

Certainly, the first server may alternatively determine the account level of the first account in another manner. This is not limited in this embodiment of this application.

For different first information, the first terminal apparatus may transmit the target media stream in different manners. The first information includes information about the target media stream, and that the first server transmits the target media stream in the first media stream to the first terminal apparatus according to an indication of the first information includes the following steps:

First, the first server determines the target media stream in the first media stream according to the information about the target streaming media.

Then, the first server transmits the target media stream to the first terminal apparatus.

In other words, in this solution, the first server determines the target media stream of the first terminal apparatus according to the information about the target media stream that is included in the first information, and transmits the target media stream.

The first information includes an account level of a first account of the first terminal apparatus, and that the first server transmits the target media stream in the first media stream to the first terminal apparatus according to an indication of the first information includes:

the first server transmits the target media stream in the first media stream according to media stream levels corresponding to various media streams in the first media stream and the account level; and the first server transmits the target media stream to the first terminal apparatus.

In other words, in this solution, the first server determines the target media stream according to the media stream levels of various media streams and the account level of the first account of the first terminal apparatus, and transmits the target media stream.

If it is set that the media stream level of the target media stream is the same as the account level of the first account, when determining the target media stream in the first media stream, the first server determines that a media stream whose media stream level is the same as the account level of the first account in the first media stream is the target media stream.

In addition, if a correspondence between a media stream level of a media stream and an account level of a first account is set, in this embodiment of this application, when determining the target media stream in the first media stream, the first server determines the target media stream of the first terminal apparatus according to the account level of the first account and the correspondence.

Figure 10:
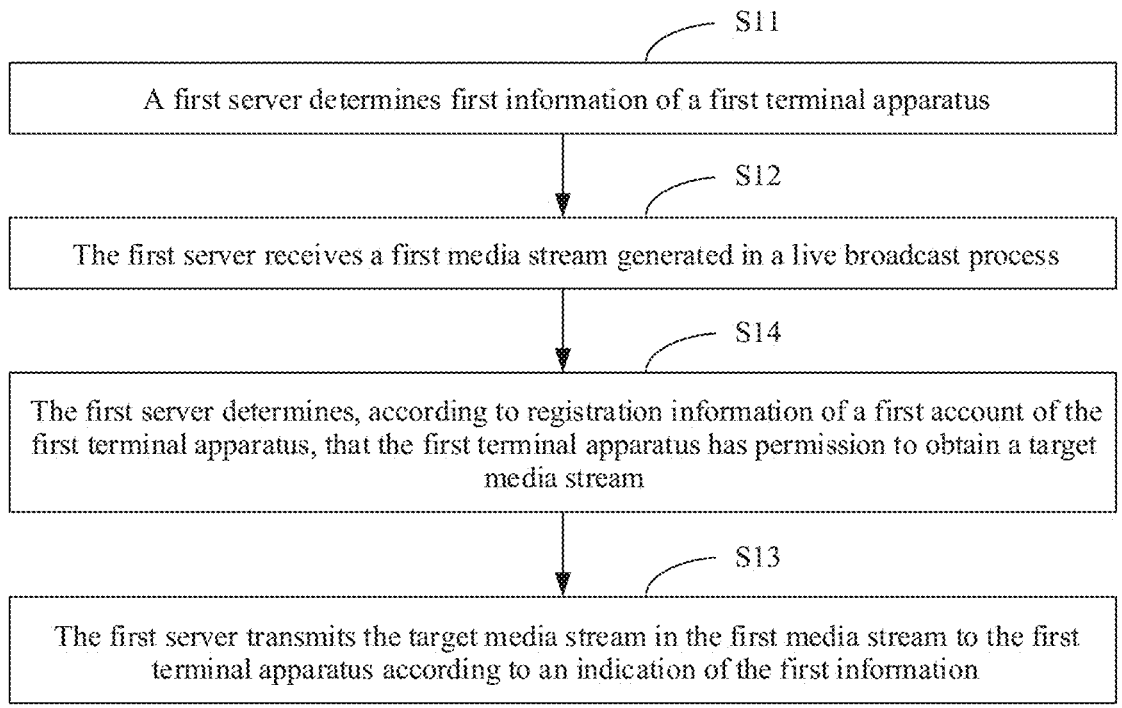
FIG. 10 is a schematic diagram of a workflow of a live broadcast method according to an embodiment of this application.

Further, refer to a schematic diagram of a workflow shown in FIG. 10. This embodiment of this application further includes the following steps:

Step S14: The first server determines, according to registration information of the first account of the first terminal apparatus, that the first terminal apparatus has permission to obtain the target media stream.

The first account is an account registered by the first terminal apparatus with the first server.

Through this step, the first server may authenticate the first account to determine whether the first terminal apparatus has permission to obtain the target media stream, and transmit the target media stream to the first terminal apparatus after determining that the first terminal apparatus has the permission.

According to the foregoing solution, the first server may transmit the target media stream to the first terminal apparatus after determining that the first terminal apparatus has permission to obtain the target media stream, thereby improving reliability of a communication system formed by the first server and the first terminal apparatus.

In FIG. 10 provided in this embodiment of this application, after the operation in step S12 is performed, the operation in step S14 is performed. In other words, after receiving the first media stream, the first server determines, based on the registration information of the first account, whether the first terminal apparatus has permission to obtain the target media stream. In an actual application scenario, there is no strict limitation on a time sequence between the two steps. For example, the first server may also determine, in advance according to the registration information of the first account, that the first terminal apparatus has permission to obtain the target media stream, and then after receiving the first media stream in the live broadcast process, the first server transmits the target media stream to the first terminal apparatus having the permission.

Correspondingly, an embodiment of this application provides a live broadcast method, where the method is applied to a first terminal apparatus, and the first terminal apparatus includes a terminal apparatus configured to display live content. A user can watch the live content by using the first terminal apparatus.

Figure 11:
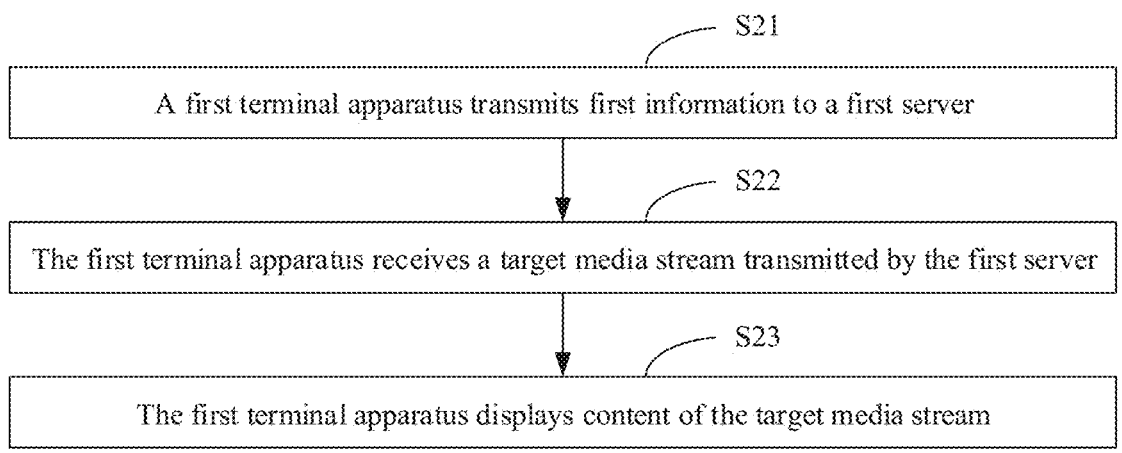
FIG. 11 is a schematic diagram of a workflow of a live broadcast method according to an embodiment of this application.

Refer to a schematic diagram of a workflow shown in FIG. 11. A live broadcast method according to an embodiment of this application includes the following steps.

Step S21: A first terminal apparatus transmits first information to a first server, where the first information is used to indicate a target media stream that the first terminal apparatus needs to obtain.

The first server may obtain the first media stream generated in a live broadcast process. After receiving the first information, the first server determines the target media stream in the first media stream according to the first information, where the target media stream is at least one type of media stream in the first media stream.

Step S22: The first terminal apparatus receives the target media stream transmitted by the first server.

After determining the target media stream in the first media stream, the first server transmits the target media stream to the first terminal apparatus, so that the first terminal apparatus obtains the target media stream.

Step S23: The first terminal apparatus displays content of the target media stream.

After receiving the target media stream, the first terminal apparatus may perform processing such as decoding on the target media stream, and display the content of the target media stream.

To ensure a live broadcast effect, after obtaining the first media stream, the first server usually transmits the target media stream in the first media stream to the first terminal apparatus in real time. In addition, after receiving the target media stream, the first terminal apparatus usually displays the content of the target media stream in real time, so that the first terminal apparatus has a good live broadcast effect, and it is ensured that content displayed by each first terminal apparatus is synchronized.

According to the solution provided in this embodiment of this application, the first terminal apparatus needs to display only content of the target media stream, thereby avoiding that too many types of media streams are displayed on the same first terminal apparatus, avoiding a problem that a display space for media streams is relatively small, avoiding a problem that a user cannot clearly watch the live content, and improving watching experience of the user.

In this embodiment of this application, the first information may include a plurality of forms. In a feasible solution, the first information includes information about the target media stream.

In another feasible solution, the first information includes an account level of a first account of the first terminal apparatus, and the first account is an account registered by the first terminal apparatus with the first server.

Figure 12:
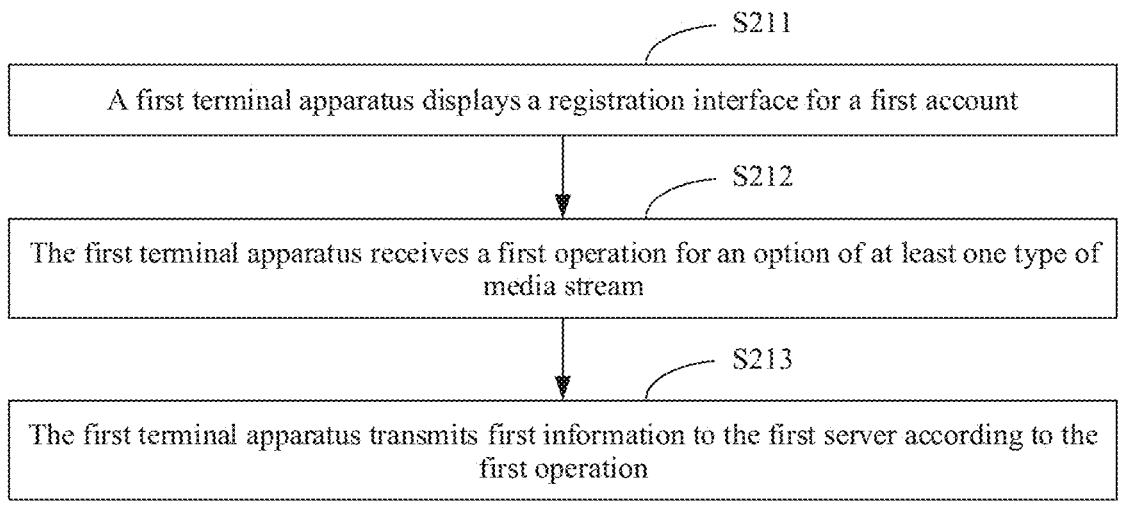
FIG. 12 is a schematic diagram of a workflow of a live broadcast method according to an embodiment of this application.

If the first information includes the information about the target media stream, refer to a schematic diagram of a workflow shown in FIG. 12. That a first terminal apparatus transmits first information to a first server includes the following steps:

Step S211: The first terminal apparatus displays a registration interface for the first account.

The first account is an account registered by the first terminal apparatus with the first server, and the registration interface includes an option of at least one type of media stream.

If the first terminal apparatus needs to watch the live broadcast, the first terminal apparatus needs to register an account with the first server. In a registration process, the first terminal apparatus displays a registration interface for the first account, so as to receive a registration operation of the user. In the solution provided in this embodiment of this application, the registration interface not only includes an area for receiving the registration operation, but also includes an area for displaying an option of at least one type of media stream, so that a user selects an option corresponding to a target media stream.

Step S212: The first terminal apparatus receives a first operation for the option of the at least one type of media stream, where the first operation is used to select a target media stream in the at least one type of media stream.

For example, the media stream options displayed on the registration interface include a media stream of a shared desktop, a media stream of a camera, and a media stream of communication information; and the first terminal apparatus expects to receive a media stream of communication information, that is, the target media stream of the first terminal apparatus is the media stream of communication information. In this case, the first operation may be a selection operation for a media stream of communication information that is displayed on the registration interface.

Step S213: The first terminal apparatus transmits the first information to the first server according to the first operation.

In this step, the first terminal apparatus may simultaneously transmit the first information and the registration information of the first account to the first server. Alternatively, the first terminal apparatus may transmit the first information to the first server after transmitting the registration information of the first account.

According to the foregoing solution, the first terminal apparatus may determine the first information according to the first operation for the registration interface, so that the first server determines, according to the first information, the target media stream that needs to be transmitted to the first terminal apparatus. In this case, the first terminal apparatus may generate the first information in a process of registering the first account.

In addition, in an application process of the first terminal apparatus, the target media stream that the first terminal apparatus expects to obtain may change. To meet this requirement, refer to a schematic diagram of a workflow shown in FIG. 13. This embodiment of this application further provides the following steps.

Step S214: The first terminal apparatus receives a second operation.

Step S215: The first terminal apparatus displays, in response to the second operation, a selection interface that includes an option of at least one type of media stream.

The second operation is used to trigger the first terminal apparatus to display the selection interface. The second operation may include operations in a plurality of forms. For example, the second operation may include a touch-and-hold operation on an area on an interface that displays the live content, or the second operation may include a sliding operation along a specific trajectory in an area on an interface that displays the live content. Certainly, the second operation may alternatively be an operation in another form. This is not limited in this embodiment of this application.

Step S216: The first terminal apparatus receives a third operation for the selection interface, where the third operation is used to select a target media stream that the first terminal apparatus needs to obtain.

Step S217: The first terminal apparatus adjusts the first information according to the third operation, and transmits the adjusted first information to the first server.

The adjusted first information includes information about the target media stream selected in the third operation. After receiving the adjusted first information, the first server determines, according to the adjusted first information, the target media stream transmitted by the first terminal apparatus.

Through the operations in step S214 to step S217, the first terminal apparatus may adjust the first information according to a requirement of the first terminal apparatus for obtaining the target media stream, and transmit the adjusted first information to the first server, so that the first server transmits the target media stream to the first terminal apparatus according to the adjusted first information, thereby meeting the requirement of the first terminal apparatus for obtaining the target media stream.

Figure 14A:
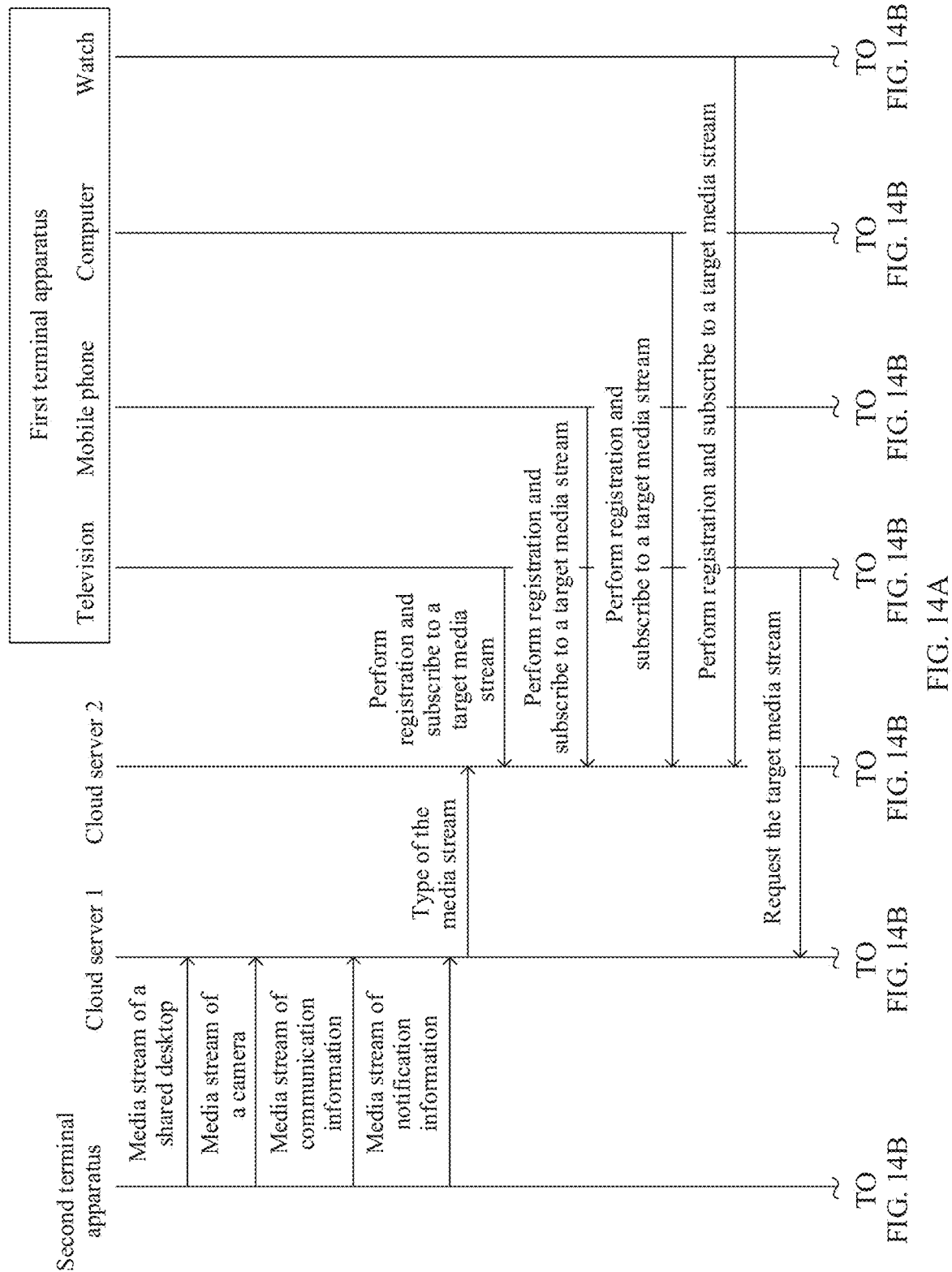
FIG. 14A-FIG. 14B are a schematic diagram of information exchange in a communication system according to an embodiment of this application.
Figure 14B:
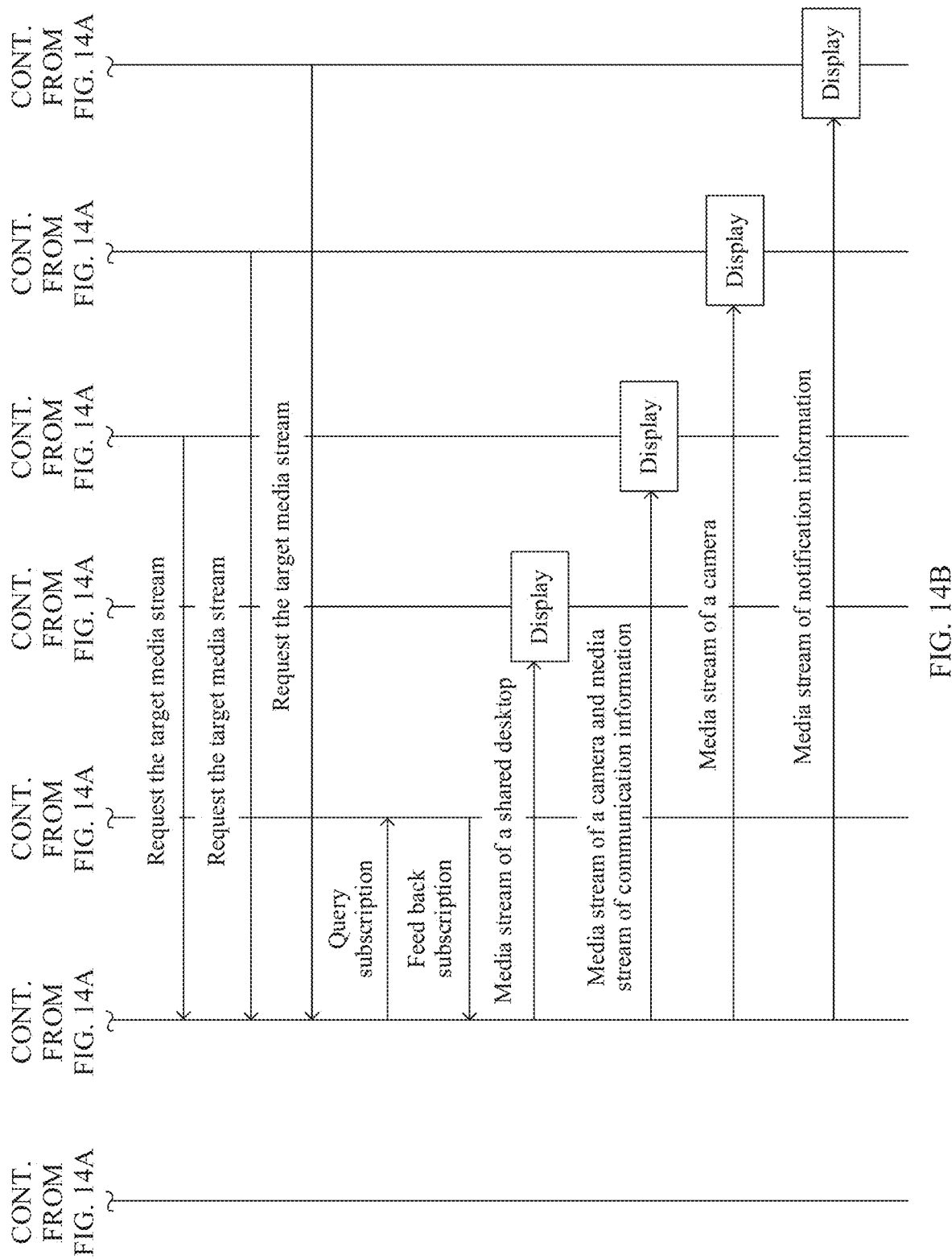

The foregoing embodiments of this application provide the live broadcast method performed by the first server and the live broadcast method performed by the first terminal apparatus. To clarify advantages of this application, an example is disclosed below, and FIG. 14A-FIG. 14B are disclosed. FIG. 14A-FIG. 14B are a schematic diagram of interaction in a communication system to which a live broadcast method according to an embodiment of this application is applied.

In this example, the communication system includes: a first terminal apparatus, a first server, and a second terminal apparatus. In addition, in this example, the first terminal apparatus includes four terminal apparatuses owned by a same user: a television, a mobile phone, a computer, and a watch. The first server includes a cloud server 1 and a cloud server 2.

The second terminal apparatus is configured to generate a first media stream in a live broadcast process. In this example, the first media stream includes: a media stream of a shared desktop, a media stream of a camera, a media stream of communication information, and a media stream of notification information, where the notification information is used to notify information such as a subscribed announcement in a live broadcast process. In addition, after generating the foregoing four types of media streams, the second terminal apparatus may report the media streams to the cloud server 1 in real time.

Before the current live broadcast starts, the cloud server 1 may determine, according to the previous live content, types of various media streams included in the first media stream, and report the types of the media streams to the cloud server 2.

The first terminal apparatus may register a first account with the cloud server 2, so as to obtain, by using the first account, a media stream required by the first terminal apparatus. After obtaining the first account registered by the first terminal apparatus, the cloud server 2 detects whether the first terminal apparatus has permission to obtain the target media stream.

In addition, each first terminal apparatus may determine, by using the cloud server 2, types of various media streams generated in a live broadcast process, and subscribe to, from the cloud server 2 by using the first information, the target media stream required by the first terminal apparatus. In this example, among the first terminal apparatuses, the television expects to obtain the media stream of a shared desktop, the mobile phone expects to obtain the media stream of a camera and the media stream of communication information, the computer expects to obtain the media stream of a camera, and the watch expects to obtain the media stream of notification information.

Each first terminal apparatus registers a first account with the cloud server 2, and in a process of registering the first account, the first terminal apparatus may receive a first operation for a registration interface for the first account, and report first information to the cloud server 2 according to the first operation, where the first information includes information about the target media stream required by the first terminal apparatus. In addition, the first information may further include information about the first account of the first terminal apparatus.

In this case, the first information reported by the television is used to subscribe to the media stream of a shared desktop, the first information reported by the mobile phone is used to subscribe to the media stream of a camera and the media stream of communication information, the first information reported by the computer is used to subscribe to the media stream of a camera, and the first information reported by the watch is used to subscribe to the media stream of notification information.

In a live broadcast process, each first terminal apparatus may send a request for obtaining live content to the cloud server 1, to request the target media stream.

After receiving the request, the cloud server 1 may determine, by interacting with the cloud server 2, whether the first terminal apparatus has permission to obtain the target media stream. If the first terminal apparatus has permission to obtain the target media stream, the cloud server 1 further queries the target media stream required by each first terminal apparatus, that is, queries the target media stream to which each first terminal apparatus has subscribed. Correspondingly, the cloud server 2 may feed back, to the cloud server 1, the target media stream to which each first terminal apparatus has subscribed.

Then, the cloud server 1 may separately transmit the target media stream in the first media stream to each first terminal apparatus. In an example in this application, the cloud server 1 may transmit the media stream of a shared desktop to the computer, transmit the media stream of a camera and the media stream of communication information to the mobile phone, transmit the media stream of a camera to the computer, and transmit the media stream of notification information to the watch.

After receiving the target media stream required by the first terminal apparatus, each first terminal apparatus performs corresponding display, so that different first terminal apparatuses may display content of the target media stream required by the first terminal apparatus.

Specifically, in this example, the computer displays the content of the shared desktop, the mobile phone separately displays, by using different areas of the screen, the content shot by the camera and the content of the communication information, the computer displays the content shot by the camera, and the mobile phone displays the content of the notification information.

In this case, the first terminal apparatuses do not interfere with each other, and a size of the area displaying the content of each type of media stream is relatively large, so that the user can watch the target media stream conveniently, and the experience of the user when watching the live broadcast is improved.

The following provides apparatus embodiments of this application that may be used to perform the method embodiments of this application. For details not disclosed in the apparatus embodiments of this application, refer to the method embodiments of this application.

Figure 15:
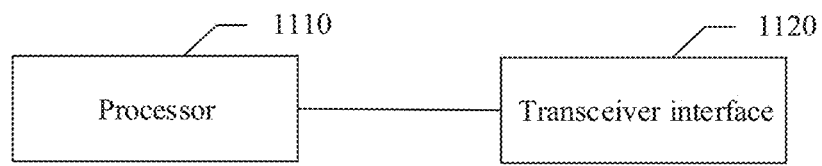
FIG. 15 is a schematic diagram of a structure of a live broadcast apparatus according to an embodiment of this application.

As implementation of the foregoing embodiments, an embodiment of this application discloses a live broadcast apparatus. Refer to a schematic diagram of a structure shown in FIG. 15. The live broadcast apparatus disclosed in this embodiment of this application includes a processor 1110 and a transceiver interface 1120.

The live broadcast apparatus is generally applied to a first server. In this embodiment of this application, the first server is connected to a first terminal apparatus and a second terminal apparatus through a communication network. The first terminal apparatus includes a terminal apparatus that displays live content, and the second terminal apparatus includes a terminal apparatus that generates live content.

The processor 1110 is configured to determine first information of a first terminal apparatus, where the first information is used to indicate a target media stream that the first terminal apparatus needs to obtain.

The transceiver interface 1120 is configured to receive a first media stream generated in a live broadcast process, and transmit the target media stream in the first media stream to the first terminal apparatus according to an indication of the first information.

In this embodiment of this application, the first server may be connected to the second terminal apparatus that generates the live content. The second terminal apparatus generates a media stream of the live content in a live broadcast process, and transmits the first media stream to the first server in real time.

The first media stream usually includes at least one type of media stream. In this case, after receiving the first information, the live broadcast apparatus may determine, according to the first information, the target media stream that the first terminal apparatus needs to obtain, and transmit the target media stream to the first terminal apparatus through the transceiver interface.

In this step, to improve experience of a user when watching the live broadcast, the transceiver interface 1120 usually transmits the target media stream to the first terminal apparatus in real time after receiving the first media stream.

In an existing live broadcast solution, a terminal apparatus for displaying live content usually obtains all types of media streams generated in a live broadcast process, and displays content of all types of media streams on a screen of the terminal apparatus. The media stream generated in the live broadcast process is set as the first media stream. In the conventional technology, the terminal apparatus displays all types of media streams included in the first media stream. Because the terminal apparatus needs to display all types of media streams, a display space for each type of media stream is relatively small. Consequently, watching experience of a user is affected, and even in some cases, the user cannot clearly watch the displayed content.

According to the solution provided in this embodiment of this application, the first terminal apparatus may indicate, by using the first information transmitted to the first server, the target media stream that the first terminal apparatus needs to obtain. In this case, the first server transmits the target media stream in the first media stream to the first terminal apparatus, and the first terminal apparatus needs to display only the content of the target media stream. Therefore, the first terminal apparatus may selectively display content of media streams, so as to avoid that too many types of media streams are displayed on the same first terminal apparatus, avoid a problem that a display space for the media streams is relatively small, avoid a problem that a user cannot clearly watch live content, and improve watching experience of the user.

The first terminal apparatus indicates, by using the first information, the target media stream that the first terminal apparatus needs to obtain. The first information may include a plurality of types of information. In a feasible implementation solution, the first information includes information about the target media stream.

Alternatively, in another feasible implementation solution, the first information includes an account level of a first account of the first terminal apparatus, and the first account is an account registered by the first terminal apparatus with the first server.

For different first information, the first terminal apparatus may transmit the target media stream in different manners. The first information includes the information about the target media stream, and the transceiver interface is specifically configured to transmit the target media stream to the first terminal apparatus after the processor determines the target media stream in the first media stream according to the information about the target streaming media.

In other words, in this solution, the first server determines the target media stream of the first terminal apparatus according to the information about the target media stream that is included in the first information, and transmits the target media stream.

In addition, the first information includes an account level of the first account of the first terminal apparatus. In this case, the transceiver interface is specifically configured to transmit the target media stream to the first terminal apparatus after the processor determines the target media stream included in the first media stream according to media stream levels corresponding to various media streams in the first media stream and the account level.

In other words, in this solution, the first server determines the target media stream according to the media stream levels of various media streams and the account level of the first account of the first terminal apparatus, and transmits the target media stream.

Further, in this embodiment of this application, the processor is further configured to determine, according to registration information of the first account of the first terminal apparatus, that the first terminal apparatus has permission to obtain the target media stream, where the first account is an account registered by the first terminal apparatus with the first server.

According to the foregoing solution, the first server may transmit the target media stream to the first terminal apparatus after determining that the first terminal apparatus has permission to obtain the target media stream, thereby improving security of a communication system formed by the first server and the first terminal apparatus.

Correspondingly, an embodiment of this application further provides a live broadcast apparatus. The apparatus may be generally applied to a first terminal apparatus. The first terminal apparatus includes a terminal apparatus configured to display live content. A user can watch the live content by using the first terminal apparatus.

The live broadcast apparatus includes a processor and a transceiver interface.

The transceiver interface is configured to: transmit first information to a first server, where the first information is used to indicate a target media stream that the first terminal apparatus needs to obtain; and receive the target media stream transmitted by the first server.

The processor is configured to control a screen to display content of the target media stream.

After receiving the first information, the first server may determine the target media stream in the first media stream according to the first information, where the target media stream is at least one type of media stream in the first media stream. Then, the first server will transmit the target media stream to the first terminal apparatus.

In this case, the first terminal apparatus may receive, through the transceiver interface, the target media stream transmitted by the first server, and the processor controls a screen of the first terminal apparatus to display content of the target media stream, so as to meet a requirement of a user for watching live broadcast.

In this embodiment of this application, the first information may include a plurality of forms. In a feasible solution, the first information includes information about the target media stream.

In another feasible solution, the first information includes an account level of a first account of the first terminal apparatus, and the first account is an account registered by the first terminal apparatus with the first server.

The first information includes the information about the target media stream, and the transceiver interface is specifically configured to: after displaying a registration interface for the first account and receiving a first operation for an option of at least one type of media stream, transmit the first information to the first server according to the first operation.

The first account is an account registered by the first terminal apparatus with the first server, the registration interface includes an option of at least one type of media stream, and the first operation is used to select a target media stream in the at least one type of media stream.

If the first information includes the information about the target media stream, the first terminal apparatus may display a registration interface for the first account, where the registration interface includes an option of at least one type of media stream, so that the user selects an option corresponding to the target media stream.

In addition, the first operation may be a selection operation for a media stream of communication information displayed on a registration interface. After receiving the first operation for the at least one type of media stream option, the first terminal apparatus may transmit the first information to the first server, so that the first server determines the target media stream according to the first information.

Further, in an application process of the first terminal apparatus, the target media stream that the first terminal apparatus expects to obtain may change. To meet this requirement, in the solution provided in this embodiment of this application, the transceiver interface is further configured to receive a second operation. The second operation is used to trigger the first terminal apparatus to display the selection interface.

The processor is further configured to display, in response to the second operation, a selection interface including an option of at least one type of media stream.

The transceiver interface is further configured to receive a third operation for the selection interface, where the third operation is used to select the target media stream that the first terminal apparatus needs to obtain.

The processor is further configured to adjust the first information according to the third operation.

The processor is further configured to transmit the adjusted first information to the first server, where the adjusted first information includes the information about the target media stream selected in the third operation.

The adjusted first information includes information about the target media stream selected in the third operation. After receiving the adjusted first information, the first server determines, according to the adjusted first information, the target media stream transmitted by the first terminal apparatus.

According to the foregoing solution, the first terminal apparatus may adjust the first information according to a requirement of the first terminal apparatus for obtaining the target media stream, and transmit the adjusted first information to the first server, so that the first server transmits the target media stream to the first terminal apparatus according to the adjusted first information, thereby meeting the requirement of the first terminal apparatus for obtaining the target media stream.

Figure 16:
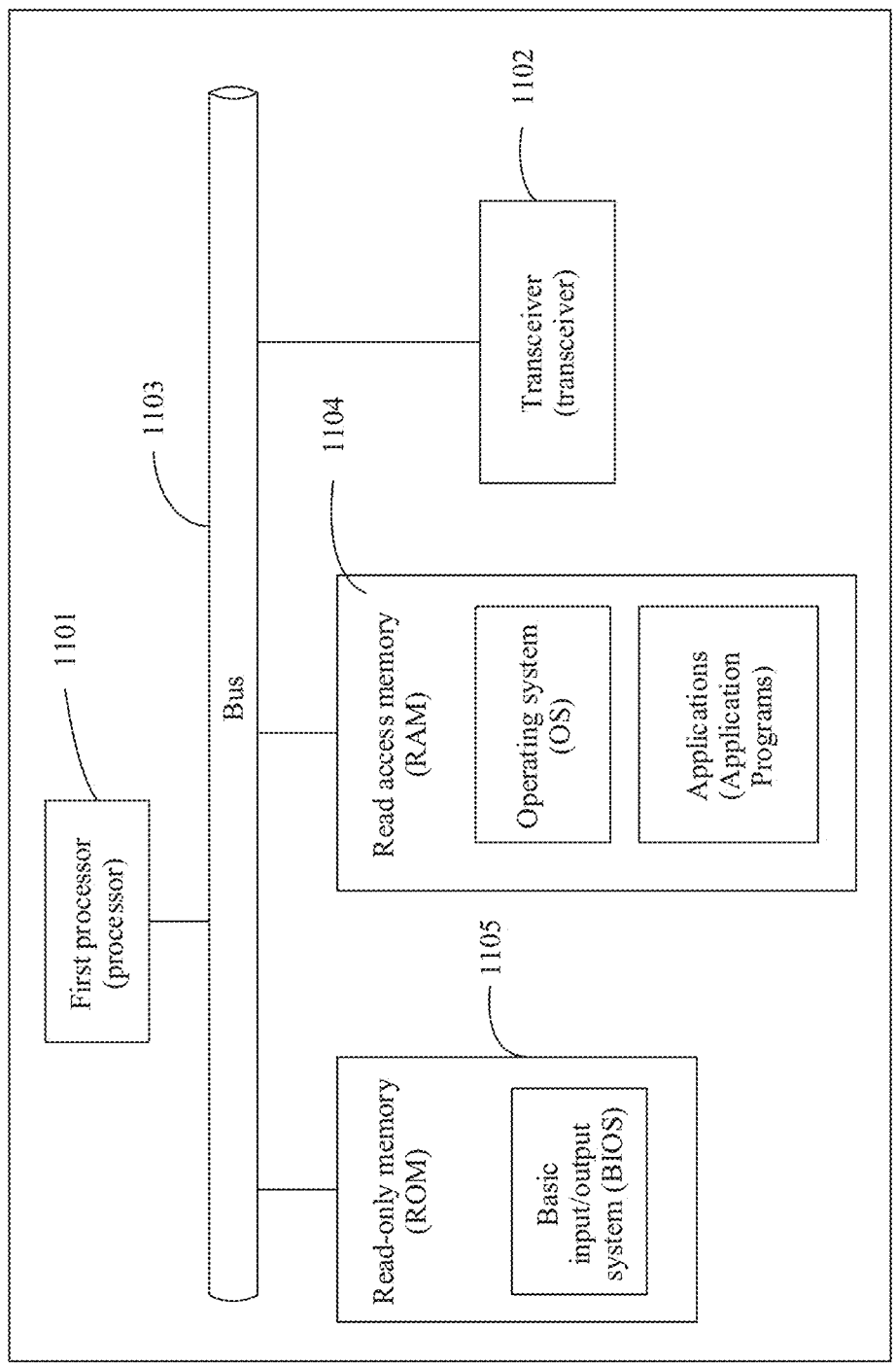
FIG. 16 is a schematic diagram of a structure of a server according to an embodiment of this application.

Correspondingly, corresponding to the foregoing method, an embodiment of this application further discloses a server. Refer to a schematic diagram of a structure shown in FIG. 16. The server includes:

at least one first processor 1101 and a memory, where
the memory is configured to store program instructions; and
the first processor is configured to invoke and execute the program instructions stored in the memory, so that the terminal apparatus performs all or some of the steps in the embodiments corresponding to FIG. 7 and FIG. 10.

Further, the terminal apparatus may further include: a transceiver 1102 and a bus 1103; and the memory includes a random access memory 1104 and a read-only memory 1105.

The first processor is coupled to the transceiver, the random access memory, and the read-only memory through the bus. When the terminal apparatus needs to run, a basic input/output system built into the read-only memory or a bootloader boot system in an embedded system is used for startup, so that the terminal apparatus enters a normal running state. After entering the normal running state, the terminal apparatus runs an application and an operating system in the random access memory, so that the terminal apparatus performs all or some of the steps in the embodiments corresponding to FIG. 7 and FIG. 10.

The apparatus in this embodiment of the present invention may correspond to the live broadcast apparatuses in the embodiments corresponding to FIG. 7 and FIG. 10. In addition, the processor and the like in the apparatus may implement functions of the live broadcast apparatus or various steps and methods implemented in the embodiments corresponding to FIG. 7 and FIG. 10. For brevity, details are not described herein again.

Figure 13:
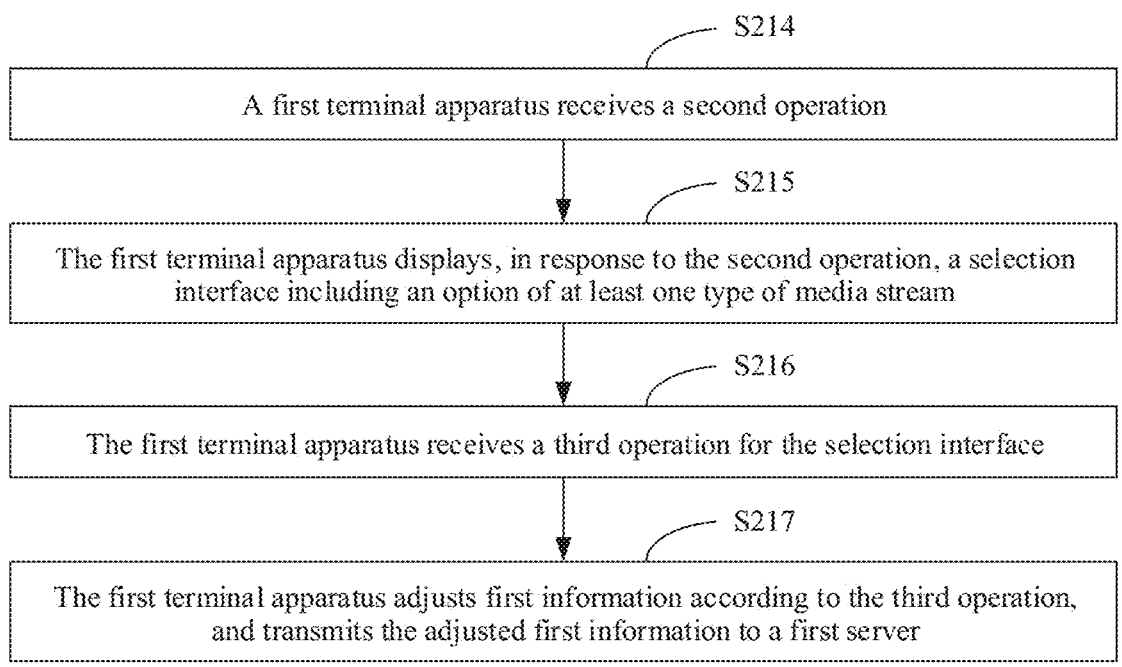
FIG. 13 is a schematic diagram of a workflow of a live broadcast method according to an embodiment of this application.

Correspondingly, corresponding to the foregoing method, an embodiment of this application further discloses a terminal apparatus. The terminal apparatus includes:

at least one first processor and a memory, where
the memory is configured to store program instructions; and
the first processor is configured to invoke and execute the program instructions stored in the memory, so that the terminal apparatus performs all or some of the steps in the embodiments corresponding to FIG. 11 to FIG. 13.

Further, the terminal apparatus may further include: a transceiver and a bus, and the memory includes a random access memory and a read-only memory.

The first processor is coupled to the transceiver, the random access memory, and the read-only memory through the bus. When the terminal apparatus needs to run, a basic input/output system built into the read-only memory or a bootloader boot system in an embedded system is used for startup, so that the terminal apparatus enters a normal running state. After entering the normal running state, the terminal apparatus runs an application and an operating system in the random access memory, so that the terminal apparatus performs all or some of the steps in the embodiments corresponding to FIG. 11 to FIG. 13.

The apparatus in this embodiment of the present invention may correspond to the live broadcast apparatuses in the embodiments corresponding to FIG. 11 to FIG. 13. In addition, the processor and the like in the apparatus may implement functions of the live broadcast apparatus or various steps and methods implemented in the embodiments corresponding to FIG. 11 to FIG. 13. For brevity, details are not described herein again.

Correspondingly, an embodiment of this application provides a live broadcast system, where the live broadcast system includes a server and a terminal apparatus.

In this embodiment of this application, the server may be used as a first server in a communication system used for live broadcast. In a live broadcast process, the server obtains a first media stream generated in the live broadcast process, determines a target media stream in the first media stream according to first information of a first terminal apparatus, and transmits the target media stream to the first terminal apparatus, so that the first terminal apparatus displays content of the target media stream.

In this embodiment of this application, the server may correspond to the live broadcast apparatuses in the embodiments corresponding to FIG. 7 and FIG. 10, and the processor and the like in the apparatus may implement functions of the live broadcast apparatuses in the embodiments corresponding to FIG. 7 and FIG. 10 or various steps and methods implemented by the live broadcast apparatus. For brevity, details are not described herein again.

In this embodiment of this application, the terminal apparatus may be used as a first terminal apparatus in a communication system used for live broadcast. In a live broadcast process, the terminal apparatus may obtain a target media stream transmitted by the first server, and display content of the target media stream.

In this embodiment of this application, the terminal apparatus may correspond to the live broadcast apparatuses in the embodiments corresponding to FIG. 11 to FIG. 13. In addition, the processor and the like in the apparatus may implement functions of the live broadcast apparatus or various steps and methods implemented in the embodiments corresponding to FIG. 11 to FIG. 13. For brevity, details are not described herein again.

Further, the system provided in this embodiment of this application usually further includes a second terminal apparatus, and the second terminal apparatus includes a terminal apparatus configured to generate live content. In a live broadcast process, the second terminal apparatus may generate a first media stream, where the first media stream includes at least one type of media stream. In addition, after generating the first media stream, the second terminal apparatus transmits the first media stream to the first server, and the first server transmits the target media stream in the first media stream to the corresponding first terminal apparatus, so that the first terminal apparatus may display content of the target media stream.

In specific implementation, an embodiment of this application further provides a computer-readable storage medium, where the computer-readable storage medium includes instructions. When a computer-readable medium disposed in any device runs on a computer, all or some of the steps in the embodiments corresponding to FIG. 7 and FIG. 10 may be implemented. The computer-readable storage medium may include a magnetic disk, an optical disc, a read-only memory (English: read-only memory, ROM for short), or a random access memory (English: random access memory, RAM for short), or the like.

In specific implementation, an embodiment of this application further provides a computer-readable storage medium, where the computer-readable storage medium includes instructions. When the computer-readable medium disposed in any device runs on a computer, all or some of the steps in the embodiments corresponding to FIG. 11 to FIG. 13 may be implemented. The computer-readable storage medium may include a magnetic disk, an optical disc, a read-only memory (English: read-only memory, ROM for short), or a random access memory (English: random access memory, RAM for short), or the like.

In addition, another embodiment of this application further discloses a computer program product including instructions. When the computer program product runs on an electronic device, the electronic device is enabled to perform all or some of the steps in the embodiments corresponding to FIG. 7 and FIG. 10.

In addition, other embodiments of this application further disclose a computer program product including instructions. When the computer program product runs on an electronic device, the electronic device is enabled to perform all or some of the steps in embodiments corresponding to FIG. 1 to FIG. 13.

The various illustrative logical blocks, units, and circuits described in embodiments of this application may implement or operate the described functions by using a general-purpose processor, a digital information processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a micro-processor. Optionally, the general-purpose processor may be any conventional processor, controller, microcontroller, or state machine. The processor may alternatively be implemented by a combination of computing apparatuses, such as a digital information processor and a microprocessor, a plurality of microprocessors, one or more microprocessors with a digital information processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to the processor, so that the processor may read information from the storage medium and may write information to the storage medium. Optionally, the storage medium may alternatively be integrated into the processor. The processor and the storage medium may be disposed in an ASIC, and the ASIC may be disposed in a UE. Optionally, the processor and the storage medium may be disposed in different components of a UE.

It should be understood that sequence numbers of the processes do not mean an execution sequence in various embodiments of this application. The execution sequence of the processes should be determined based on functions and internal logic of the processes, and should not be construed as any limitation on implementation processes of embodiments of this application.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some procedures or functions in embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

For same or similar parts in embodiments in this specification, refer to these embodiments. Each embodiment focuses on a difference from other embodiments. Especially, apparatus and system embodiments are basically similar to the method embodiments, and therefore are described briefly. For related parts, refer to partial descriptions in the method embodiments.

A person skilled in the art may clearly understand that the technology in embodiments of the present invention may be implemented by using software and a required universal hardware platform. Based on such an understanding, the technical solutions in embodiments of the present invention essentially or the part contributing to the conventional technology may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in embodiments or some parts of embodiments of the present invention.

For same or similar parts in embodiments of this specification, refer to each other. Especially, the road constraint determining apparatus embodiments disclosed in this application are basically similar to the method embodiments, and therefore are described briefly. For related parts, reference may be made to descriptions in the method embodiments.

The foregoing descriptions are implementations of the present invention, but are not intended to limit the protection scope of the present invention.

What is claimed is:

1. A live broadcast method, comprising:
   determining, by a server, first information of a terminal apparatus, wherein the first information indicates a target media stream for the terminal apparatus to obtain, and wherein the target media stream is one of multiple types of media streams simultaneously generated in a same live broadcast process;
   receiving, by the server, the multiple types of media streams generated in the same live broadcast process; and
   transmitting, by the server, the target media stream to the terminal apparatus according to an indication of the first information.

2. The method according to claim 1, wherein the first information comprises information about the target media stream or an account level of a first account of the terminal apparatus, wherein the first account is an account registered by the terminal apparatus with the server.

3. The method according to claim 1, wherein the first information comprises information about the target media stream, and the transmitting, by the server, the target media stream to the terminal apparatus according to an indication of the first information comprises:
   determining, by the server, the target media stream according to the information about the target media stream; and
   transmitting, by the server, the target media stream to the terminal apparatus.

4. The method according to claim 1, wherein the first information comprises an account level of a first account of the terminal apparatus, and the transmitting, by the server, the target media stream to the terminal apparatus according to an indication of the first information comprises:
   determining, by the server, the target media stream according to media stream levels corresponding to the multiple types of media streams and the account level; and
   transmitting, by the server, the target media stream to the terminal apparatus.

5. The method according to claim 1, further comprising:
   determining, by the server according to registration information of a first account of the terminal apparatus, that the terminal apparatus has permission to obtain the target media stream, wherein the first account is an account registered by the terminal apparatus with the server.

6. The method according to claim 1, wherein the terminal apparatus is a television, and the target media stream is a media stream of a shared desktop.

7. The method according to claim 1, wherein the terminal apparatus is a computer, and the target media stream is a media stream of a camera.

8. A live broadcast method, comprising:
   transmitting, by a terminal apparatus, first information to a server, wherein the first information indicates a target media stream for the terminal apparatus to obtain, and wherein the target media stream is one of multiple types of media streams simultaneously generated in a same live broadcast process;
   receiving, by the terminal apparatus, the target media stream transmitted by the server; and
   displaying, by the terminal apparatus, content of the target media stream.

9. The method according to claim 8, wherein the first information comprises information about the target media stream or an account level of a first account of the terminal apparatus, wherein the first account is an account registered by the terminal apparatus with the server.

10. The method according to claim 9, wherein the first information comprises information about the target media stream, and the transmitting, by a terminal apparatus, first information to a server comprises:
    displaying, by the terminal apparatus, a registration interface for the first account, wherein the registration interface comprises an option of at least one type of media stream;
    receiving, by the terminal apparatus, a first operation for the option of the at least one type of media stream, wherein the first operation indicates a selection of the target media stream in the at least one type of media stream; and
    transmitting, by the terminal apparatus, the first information to the server according to the first operation.

11. The method according to claim 10, further comprising:
    receiving, by the terminal apparatus, a second operation;
    displaying, by the terminal apparatus in response to receiving the second operation, a selection interface comprising the option of the at least one type of media stream;
    receiving, by the terminal apparatus, a third operation for the selection interface, wherein the third operation indicates a selection of the target media stream for the terminal apparatus; and
    adjusting, by the terminal apparatus, the first information according to the third operation, and transmitting the adjusted first information to the server, wherein the adjusted first information comprises the information about the target media stream selected in the third operation.

12. The method according to claim 8, wherein the terminal apparatus is a television, and the target media stream is a media stream of a shared desktop.

13. The method according to claim 8, wherein the terminal apparatus is a computer, and the target media stream is a media stream of a camera.

14. An apparatus, comprising:
    at least one processor, at least one memory coupled to the at least one processor, and a transceiver interface, wherein the at least one memory stores programming instructions for execution by the at least one processor to cause the apparatus to perform operations comprising:

transmitting, by the transceiver interface, first information to a server, wherein the first information indicates a target media stream for the apparatus to obtain, and wherein the target media stream is one of multiple types of media streams simultaneously generated in a same live broadcast process;

receiving, by the transceiver interface, the target media stream transmitted by the server; and controlling a screen to display content of the target media stream.

15. The apparatus according to claim 14, wherein the first information comprises information about the target media stream or an account level of a first account of the apparatus, wherein the first account is an account registered by the apparatus with the server.

16. The apparatus according to claim 15, wherein:

the first information comprises information about the target media stream;

the operations further comprise after displaying a registration interface for the first account and receiving a first operation for an option of at least one type of media stream, transmitting, by the transceiver interface, the first information to the server according to the first operation;

the registration interface comprises an option of at least one type of media stream; and the first operation indicates a selection of the target media stream in the at least one type of media stream.

17. The apparatus according to claim 16, wherein the operations further comprise:

receiving, by the transceiver interface, a second operation;

displaying, by the at least one processor, in response to receiving the second operation, a selection interface comprising the option of the at least one type of media stream;

receiving, by the transceiver interface, a third operation for the selection interface, wherein the third operation indicates a selection of the target media stream for the apparatus;

adjusting, by the at least one processor, the first information according to the third operation; and transmitting, by the at least one processor, the adjusted first information to the server, wherein the adjusted first information comprises the information about the target media stream selected in the third operation.

18. The apparatus according to claim 14, wherein the apparatus is a television, and the target media stream is a media stream of a shared desktop.

19. The apparatus according to claim 14, wherein the apparatus is a computer, and the target media stream is a media stream of a camera.

20. The apparatus according to claim 14, wherein the target media stream is a media stream of a movie.

* * * * *